(12) United States Patent
Kinpara et al.

(10) Patent No.: US 7,873,244 B2
(45) Date of Patent: Jan. 18, 2011

(54) LIGHT CONTROL DEVICE

(75) Inventors: Yuhki Kinpara, Chiyoda-ku (JP);
Junichiro Ichikawa, Chiyoda-ku (JP);
Satoshi Oikawa, Chiyoda-ku (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 22 days.

(21) Appl. No.: 12/311,442

(22) PCT Filed: Sep. 28, 2007

(86) PCT No.: PCT/JP2007/068999

§ 371 (c)(1),
(2), (4) Date: Jun. 15, 2009

(87) PCT Pub. No.: WO2008/038778

PCT Pub. Date: Apr. 3, 2008

(65) Prior Publication Data

US 2009/0324156 A1    Dec. 31, 2009

(30) Foreign Application Priority Data

Sep. 30, 2006   (JP)   ................................ 2006-270181

(51) Int. Cl.
*G02F 1/035*   (2006.01)
*G02F 1/01*    (2006.01)
*G02B 6/26*    (2006.01)
*G02B 6/42*    (2006.01)

(52) U.S. Cl. .................................. 385/2; 385/1; 385/40

(58) Field of Classification Search ..................... 385/2, 385/40

See application file for complete search history.

(56) References Cited

U.S. PATENT DOCUMENTS

| | | | |
|---|---|---|---|
| 5,388,170 | A  | 2/1995 | Heismann et al. |
| 6,580,843 | B2 | 6/2003 | Doi et al. |
| 7,035,485 | B2 | 4/2006 | Kondo et al. |
| 7,068,863 | B2 | 6/2006 | Kondo et al. |

(Continued)

FOREIGN PATENT DOCUMENTS

JP             64-018121 A      1/1989

(Continued)

*Primary Examiner*—Rhonda S Peace
(74) *Attorney, Agent, or Firm*—Chapman and Cutler LLP

(57) ABSTRACT

To provide a light control device which is possible to realize a velocity matching between a microwave and an optical wave or an impedance matching of microwaves even through a signal oath having a high impedance of 70Ω or more, and is possible to reduce a driving voltage. The light control device having an electro-optical effect includes a thin plate 1 having a thickness of 10 μm or less, an optical waveguide 2 formed in the thin plate, and a controlling electrode from controlling light which passes through the optical waveguide, wherein the controlling electrode includes a first electrode and a second electrode which are disposed so as to interpose the thin plate, wherein the first electrode has a coplanar type electrode which includes at least a signal electrode 4 and a grounding electrode 5 (51), wherein the second electrode includes at least a grounding electrode 54 and is configured so as to apply an electric field to the optical waveguide in cooperation with the signal electrode of the first electrode, and wherein the signal electrode of the first electrode includes a branched signal path in which at least one signal path is branched into two or more in the middle of the path.

14 Claims, 21 Drawing Sheets

U.S. PATENT DOCUMENTS

| | | | |
|---|---|---|---|
| 7,324,257 B2 * | 1/2008 | McBrien et al. | 359/245 |
| 7,408,693 B2 * | 8/2008 | Kissa et al. | 359/245 |
| 2003/0044100 A1 | 3/2003 | Kondo et al. | |
| 2004/0252365 A1 * | 12/2004 | Ichikawa et al. | 359/321 |
| 2006/0269184 A1 * | 11/2006 | Ichioka et al. | 385/2 |
| 2009/0297086 A1 * | 12/2009 | Sugamata et al. | 385/2 |
| 2010/0034496 A1 * | 2/2010 | Oikawa et al. | 385/2 |
| 2010/0046880 A1 * | 2/2010 | Oikawa et al. | 385/2 |
| 2010/0046881 A1 * | 2/2010 | Oikawa et al. | 385/2 |
| 2010/0086252 A1 * | 4/2010 | Kinpara et al. | 385/2 |

FOREIGN PATENT DOCUMENTS

| | | |
|---|---|---|
| JP | 3-229214 A | 10/1991 |
| JP | 6-130338 A | 5/1994 |
| JP | 7-199134 A | 8/1995 |
| JP | 2002-182173 A | 6/2002 |
| JP | 2003-075790 A | 3/2003 |
| JP | 2003-156723 A | 5/2003 |
| JP | 2003-202530 A | 7/2003 |
| JP | 2003-215519 A | 7/2003 |
| JP | 2004-163859 A | 6/2004 |
| JP | 3638300 B2 | 4/2005 |
| JP | 2005-274793 A | 10/2005 |

* cited by examiner

FIG. 2
(a)
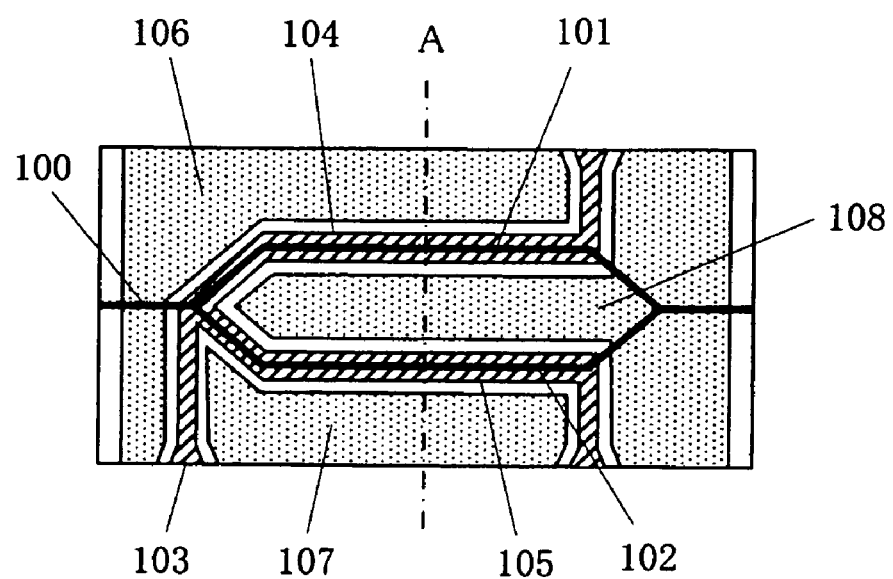
(b)
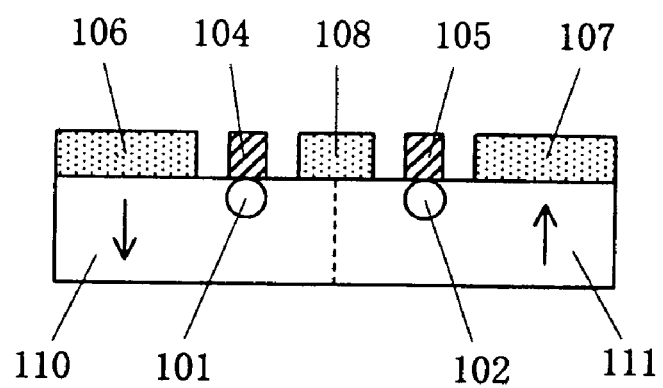

FIG. 11

| W/t | Gap/t | | D/t = 0.2 | | | | | | | | | | | | | | | | | |
|---|---|---|---|---|---|---|---|---|---|---|---|---|---|---|---|---|---|---|---|---|
| | | | T_EL = 0.5 | | | T_EL = 1 | | | T_EL = 1.5 | | | T_EL = 2 | | | T_EL = 2.5 | | | T_EL = 3 | | |
| | | | Z0 | NM | Vpi | Z0 | NM | Vpi | Z0 | NM | Vpi | Z0 | NM | Vpi | Z0 | NM | Vpi | Z0 | NM | Vpi |
| 0.2 | 1 | | O | O | × | O | × | × | O | × | × | × | × | × | × | × | × | × | × | × |
| | 2.25 | | O | O | × | O | O | × | O | O | × | O | O | × | O | × | × | O | × | × |
| | 3.5 | | O | O | × | O | O | × | O | O | × | O | O | × | O | O | × | O | O | × |
| | 4.75 | | O | O | × | O | O | × | O | O | × | O | O | × | O | O | × | O | O | × |
| | 6 | | O | O | × | O | O | × | O | O | × | O | O | × | O | O | × | O | O | × |
| 0.5 | 1 | | ⊚ | ⊚ | ⊚ | × | O | O | × | O | O | × | O | O | × | O | O | × | × | O |
| | 2.25 | | ⊚ | ⊚ | ⊚ | ⊚ | ⊚ | ⊚ | ⊚ | ⊚ | ⊚ | × | O | O | × | O | O | × | O | O |
| | 3.5 | | ⊚ | ⊚ | ⊚ | ⊚ | ⊚ | ⊚ | ⊚ | ⊚ | ⊚ | × | O | O | × | O | O | × | O | O |
| | 4.75 | | ⊚ | ⊚ | ⊚ | ⊚ | ⊚ | ⊚ | ⊚ | ⊚ | ⊚ | ⊚ | ⊚ | ⊚ | × | O | O | × | O | O |
| | 6 | | ⊚ | ⊚ | ⊚ | ⊚ | ⊚ | ⊚ | ⊚ | ⊚ | ⊚ | ⊚ | ⊚ | ⊚ | × | O | O | × | O | O |
| 0.8 | 1 | | × | O | O | × | O | O | × | O | O | × | O | O | × | O | O | × | O | O |
| | 2.25 | | × | O | O | × | O | O | × | O | O | × | O | O | × | O | O | × | O | O |
| | 3.5 | | × | O | O | × | O | O | × | O | O | × | O | O | × | O | O | × | O | O |
| | 4.75 | | × | O | O | × | O | O | × | O | O | × | O | O | × | O | O | × | O | O |
| | 6 | | × | O | O | × | O | O | × | O | O | × | O | O | × | O | O | × | O | O |
| 1.1 | 1 | | × | O | O | × | O | O | × | O | O | × | O | O | × | O | O | × | O | O |
| | 2.25 | | × | O | O | × | O | O | × | O | O | × | O | O | × | O | O | × | O | O |
| | 3.5 | | × | O | O | × | O | O | × | O | O | × | O | O | × | O | O | × | O | O |
| | 4.75 | | × | O | O | × | O | O | × | O | O | × | O | O | × | O | O | × | O | O |
| | 6 | | × | O | O | × | O | O | × | O | O | × | O | O | × | O | O | × | O | O |
| 1.4 | 1 | | × | O | O | × | O | O | × | O | O | × | O | O | × | O | O | × | O | O |
| | 2.25 | | × | O | O | × | O | O | × | O | O | × | O | O | × | O | O | × | O | O |
| | 3.5 | | × | O | O | × | O | O | × | O | O | × | O | O | × | O | O | × | O | O |
| | 4.75 | | × | O | O | × | O | O | × | O | O | × | O | O | × | O | O | × | O | O |
| | 6 | | × | O | O | × | O | O | × | O | O | × | O | O | × | O | O | × | O | O |
| 1.7 | 1 | | × | O | O | × | O | O | × | O | O | × | O | O | × | O | O | × | O | O |
| | 2.25 | | × | O | O | × | O | O | × | O | O | × | O | O | × | O | O | × | O | O |
| | 3.5 | | × | O | O | × | O | O | × | O | O | × | O | O | × | O | O | × | O | O |
| | 4.75 | | × | O | O | × | O | O | × | O | O | × | O | O | × | O | O | × | O | O |
| | 6 | | × | O | O | × | O | O | × | O | O | × | O | O | × | O | O | × | O | O |
| 2 | 1 | | × | O | O | × | O | O | × | O | O | × | O | O | × | O | O | × | O | O |
| | 2.25 | | × | O | O | × | O | O | × | O | O | × | O | O | × | O | O | × | O | O |
| | 3.5 | | × | O | O | × | O | O | × | O | O | × | O | O | × | O | O | × | O | O |
| | 4.75 | | × | O | O | × | O | O | × | O | O | × | O | O | × | O | O | × | O | O |
| | 6 | | × | O | O | × | O | O | × | O | O | × | O | O | × | O | O | × | O | O |

| W/t | | | D/t 0.2 | | | | | | | | | | | | | | | | | |
|---|---|---|---|---|---|---|---|---|---|---|---|---|---|---|---|---|---|---|---|---|
| | | | $T_{EL}$ | | | | | | | | | | | | | | | | | | |
| | | | 0.5 | | | 1 | | | 1.5 | | | 2 | | | 2.5 | | | 3 | | |
| | | | Z0 | NM | Vpi | Z0 | NM | Vpi | Z0 | NM | Vpi | Z0 | NM | Vpi | Z0 | NM | Vpi | Z0 | NM | Vpi |
| 0.2 | Gap/t | 1 | O | O | × | O | O | × | O | O | × | O | O | × | O | O | × | × | O | × |
| | | 2.25 | O | O | × | O | O | × | O | O | × | O | O | × | O | O | × | O | O | × |
| | | 3.5 | O | O | × | O | O | × | O | O | × | O | O | × | O | O | × | O | O | × |
| | | 4.75 | O | O | × | O | O | × | O | O | × | O | O | × | O | O | × | O | O | × |
| | | 6 | O | O | × | O | O | × | O | O | × | O | O | × | O | O | × | O | O | × |
| 0.5 | Gap/t | 1 | × | O | O | × | O | O | × | O | O | × | O | O | × | O | O | × | O | O |
| | | 2.25 | × | O | O | × | O | O | × | O | O | × | O | O | × | O | O | × | O | O |
| | | 3.5 | ▓ | ▓ | ▓ | × | O | O | × | O | O | × | O | O | × | O | O | × | O | O |
| | | 4.75 | ▓ | ▓ | ▓ | × | O | O | × | O | O | × | O | O | × | O | O | × | O | O |
| | | 6 | ▓ | ▓ | ▓ | × | O | O | × | O | O | × | O | O | × | O | O | × | O | O |
| 0.8 | Gap/t | 1 | × | O | O | × | O | O | × | O | O | × | O | O | × | O | O | × | O | O |
| | | 2.25 | × | O | O | × | O | O | × | O | O | × | O | O | × | O | O | × | O | O |
| | | 3.5 | × | O | O | × | O | O | × | O | O | × | O | O | × | O | O | × | O | O |
| | | 4.75 | × | O | O | × | O | O | × | O | O | × | O | O | × | O | O | × | O | O |
| | | 6 | × | O | O | × | O | O | × | O | O | × | O | O | × | O | O | × | O | O |
| 1.1 | Gap/t | 1 | × | O | O | × | O | O | × | O | O | × | O | O | × | O | O | × | O | O |
| | | 2.25 | × | O | O | × | O | O | × | O | O | × | O | O | × | O | O | × | O | O |
| | | 3.5 | × | O | O | × | O | O | × | O | O | × | O | O | × | O | O | × | O | O |
| | | 4.75 | × | O | O | × | O | O | × | O | O | × | O | O | × | O | O | × | O | O |
| | | 6 | × | O | O | × | O | O | × | O | O | × | O | O | × | O | O | × | O | O |
| 1.4 | Gap/t | 1 | × | O | O | × | O | O | × | O | O | × | O | O | × | O | O | × | O | O |
| | | 2.25 | × | O | O | × | O | O | × | O | O | × | O | O | × | O | O | × | O | O |
| | | 3.5 | × | O | O | × | O | O | × | O | O | × | O | O | × | O | O | × | O | O |
| | | 4.75 | × | O | O | × | O | O | × | O | O | × | O | O | × | O | O | × | O | O |
| | | 6 | × | O | O | × | O | O | × | O | O | × | O | O | × | O | O | × | O | O |
| 1.7 | Gap/t | 1 | × | O | O | × | O | O | × | O | O | × | O | O | × | O | O | × | O | O |
| | | 2.25 | × | O | O | × | O | O | × | O | O | × | O | O | × | O | O | × | O | O |
| | | 3.5 | × | O | O | × | O | O | × | O | O | × | O | O | × | O | O | × | O | O |
| | | 4.75 | × | O | O | × | O | O | × | O | O | × | O | O | × | O | O | × | O | O |
| | | 6 | × | O | O | × | O | O | × | O | O | × | O | O | × | O | O | × | O | O |
| 2 | Gap/t | 1 | × | O | O | × | O | O | × | O | O | × | O | O | × | O | O | × | O | O |
| | | 2.25 | × | O | O | × | O | O | × | O | O | × | O | O | × | O | O | × | O | O |
| | | 3.5 | × | O | O | × | O | O | × | O | O | × | O | O | × | O | O | × | O | O |
| | | 4.75 | × | O | O | × | O | O | × | O | O | × | O | O | × | O | O | × | O | O |
| | | 6 | × | O | O | × | O | O | × | O | O | × | O | O | × | O | O | × | O | O |

| W/t | Gap/t | | D/t 0.2 | | | | | | | | | | | | | | | | | |
|---|---|---|---|---|---|---|---|---|---|---|---|---|---|---|---|---|---|---|---|---|
| | | | $T_{EL}$ | | | | | | | | | | | | | | | | | |
| | | | 0.5 | | | 1 | | | 1.5 | | | 2 | | | 2.5 | | | 3 | | |
| | | | Z0 | NM | Vpi | Z0 | NM | Vpi | Z0 | NM | Vpi | Z0 | NM | Vpi | Z0 | NM | Vpi | Z0 | NM | Vpi |
| 0.2 | 1 | | O | O | × | O | O | × | O | O | × | O | O | × | O | O | × | × | O | × |
| | 2.25 | | O | O | × | O | O | × | O | O | × | O | O | × | O | O | × | O | O | × |
| | 3.5 | | O | O | × | O | O | × | O | O | × | O | O | × | O | O | × | O | O | × |
| | 4.75 | | O | O | × | O | O | × | O | O | × | O | O | × | O | O | × | O | O | × |
| | 6 | | O | O | × | O | O | × | O | O | × | O | O | × | O | O | × | O | O | × |
| 0.5 | 1 | | × | O | × | × | O | × | × | O | × | × | O | × | × | O | × | × | O | × |
| | 2.25 | | × | O | × | × | O | × | × | O | × | × | O | × | × | O | × | × | O | × |
| | 3.5 | | × | × | × | × | O | × | × | O | × | × | O | × | × | O | × | × | O | × |
| | 4.75 | | × | × | × | × | O | × | × | O | × | × | O | × | × | O | × | × | O | × |
| | 6 | | × | × | × | × | O | × | × | O | × | × | O | × | × | O | × | × | O | × |
| 0.8 | 1 | | × | × | O | × | × | O | × | O | O | × | O | O | × | O | × | × | O | × |
| | 2.25 | | × | × | O | × | × | O | × | × | O | × | × | O | × | × | O | × | × | O |
| | 3.5 | | × | × | O | × | × | O | × | × | O | × | × | O | × | × | O | × | × | O |
| | 4.75 | | × | × | O | × | × | O | × | × | O | × | × | O | × | × | O | × | × | O |
| | 6 | | × | × | O | × | × | O | × | × | O | × | × | O | × | × | O | × | × | O |
| 1.1 | 1 | | × | × | O | × | × | O | × | × | O | × | × | O | × | × | O | × | × | O |
| | 2.25 | | × | × | O | × | × | O | × | × | O | × | × | O | × | × | O | × | × | O |
| | 3.5 | | × | × | O | × | × | O | × | × | O | × | × | O | × | × | O | × | × | O |
| | 4.75 | | × | × | O | × | × | O | × | × | O | × | × | O | × | × | O | × | × | O |
| | 6 | | × | × | O | × | × | O | × | × | O | × | × | O | × | × | O | × | × | O |
| 1.4 | 1 | | × | × | O | × | × | O | × | × | O | × | × | O | × | × | O | × | × | O |
| | 2.25 | | × | × | O | × | × | O | × | × | O | × | × | O | × | × | O | × | × | O |
| | 3.5 | | × | × | O | × | × | O | × | × | O | × | × | O | × | × | O | × | × | O |
| | 4.75 | | × | × | O | × | × | O | × | × | O | × | × | O | × | × | O | × | × | O |
| | 6 | | × | × | O | × | × | O | × | × | O | × | × | O | × | × | O | × | × | O |
| 1.7 | 1 | | × | × | O | × | × | O | × | × | O | × | × | O | × | × | O | × | × | O |
| | 2.25 | | × | × | O | × | × | O | × | × | O | × | × | O | × | × | O | × | × | O |
| | 3.5 | | × | × | O | × | × | O | × | × | O | × | × | O | × | × | O | × | × | O |
| | 4.75 | | × | × | O | × | × | O | × | × | O | × | × | O | × | × | O | × | × | O |
| | 6 | | × | × | O | × | × | O | × | × | O | × | × | O | × | × | O | × | × | O |
| 2 | 1 | | × | × | O | × | × | O | × | × | O | × | × | O | × | × | × | × | × | × |
| | 2.25 | | × | × | O | × | × | O | × | × | O | × | × | O | × | × | O | × | × | O |
| | 3.5 | | × | × | O | × | × | O | × | × | O | × | × | O | × | × | O | × | × | O |
| | 4.75 | | × | × | O | × | × | O | × | × | O | × | × | O | × | × | O | × | × | O |
| | 6 | | × | × | O | × | × | O | × | × | O | × | × | O | × | × | O | × | × | O |

FIG. 20

| W/t | | Gap/t | D/t = 0.4 | | | | | | | | | | | | | | | | | |
|---|---|---|---|---|---|---|---|---|---|---|---|---|---|---|---|---|---|---|---|---|
| | | | $T_{EL}$ | | | | | | | | | | | | | | | | | | |
| | | | 0.5 | | | 1 | | | 1.5 | | | 2 | | | 2.5 | | | 3 | | |
| | | | Z0 | NM | Vpi | Z0 | NM | Vpi | Z0 | NM | Vpi | Z0 | NM | Vpi | Z0 | NM | Vpi | Z0 | NM | Vpi |
| 0.2 | | 1 | ○ | ○ | × | ○ | ○ | × | ○ | ○ | × | ○ | ○ | × | ○ | ○ | × | ○ | ○ | × |
| | | 2.25 | ○ | ○ | × | ○ | ○ | × | ○ | ○ | × | ○ | ○ | × | ○ | ○ | × | ○ | ○ | × |
| | | 3.5 | ○ | ○ | × | ○ | ○ | × | ○ | ○ | × | ○ | ○ | × | ○ | ○ | × | ○ | ○ | × |
| | | 4.75 | ○ | ○ | × | ○ | ○ | × | ○ | ○ | × | ○ | ○ | × | ○ | ○ | × | ○ | ○ | × |
| | | 6 | ○ | ○ | × | ○ | ○ | × | ○ | ○ | × | ○ | ○ | × | ○ | ○ | × | ○ | ○ | × |
| 0.5 | | 1 | × | ○ | ○ | × | ○ | ○ | × | ○ | ○ | × | ○ | ○ | × | ○ | ○ | × | ○ | ○ |
| | | 2.25 | × | ○ | ○ | × | ○ | ○ | × | ○ | ○ | × | ○ | ○ | × | ○ | ○ | × | ○ | ○ |
| | | 3.5 | × | ○ | ○ | × | ○ | ○ | × | ○ | ○ | × | ○ | ○ | × | ○ | ○ | × | ○ | ○ |
| | | 4.75 | × | ○ | ○ | × | ○ | ○ | × | ○ | ○ | × | ○ | ○ | × | ○ | ○ | × | ○ | ○ |
| | | 6 | × | ○ | ○ | × | ○ | ○ | × | ○ | ○ | × | ○ | ○ | × | ○ | ○ | × | ○ | ○ |
| 0.8 | | 1 | × | ○ | ○ | × | ○ | ○ | × | ○ | ○ | × | ○ | ○ | × | ○ | ○ | × | ○ | ○ |
| | | 2.25 | × | × | ○ | × | × | ○ | × | ○ | ○ | × | ○ | ○ | × | ○ | ○ | × | ○ | ○ |
| | | 3.5 | × | × | ○ | × | × | ○ | × | × | ○ | × | ○ | ○ | × | ○ | ○ | × | ○ | ○ |
| | | 4.75 | × | × | ○ | × | × | ○ | × | × | ○ | × | ○ | ○ | × | ○ | ○ | × | ○ | ○ |
| | | 6 | × | × | ○ | × | × | ○ | × | × | ○ | × | ○ | ○ | × | ○ | ○ | × | ○ | ○ |
| 1.1 | | 1 | × | × | ○ | × | × | ○ | × | × | ○ | × | ○ | ○ | × | ○ | ○ | × | ○ | ○ |
| | | 2.25 | × | × | ○ | × | × | ○ | × | × | ○ | × | × | ○ | × | × | ○ | × | × | ○ |
| | | 3.5 | × | × | ○ | × | × | ○ | × | × | ○ | × | × | ○ | × | × | ○ | × | × | ○ |
| | | 4.75 | × | × | ○ | × | × | ○ | × | × | ○ | × | × | ○ | × | × | ○ | × | × | ○ |
| | | 6 | × | × | ○ | × | × | ○ | × | × | ○ | × | × | ○ | × | × | ○ | × | × | ○ |
| 1.4 | | 1 | × | × | ○ | × | × | ○ | × | × | ○ | × | × | ○ | × | × | ○ | × | × | ○ |
| | | 2.25 | × | × | ○ | × | × | ○ | × | × | ○ | × | × | ○ | × | × | ○ | × | × | ○ |
| | | 3.5 | × | × | ○ | × | × | ○ | × | × | ○ | × | × | ○ | × | × | ○ | × | × | ○ |
| | | 4.75 | × | × | ○ | × | × | ○ | × | × | ○ | × | × | ○ | × | × | ○ | × | × | ○ |
| | | 6 | × | × | ○ | × | × | ○ | × | × | ○ | × | × | ○ | × | × | ○ | × | × | ○ |
| 1.7 | | 1 | × | × | ○ | × | × | ○ | × | × | ○ | × | × | ○ | × | × | ○ | × | × | ○ |
| | | 2.25 | × | × | ○ | × | × | ○ | × | × | ○ | × | × | ○ | × | × | ○ | × | × | ○ |
| | | 3.5 | × | × | ○ | × | × | ○ | × | × | ○ | × | × | ○ | × | × | ○ | × | × | ○ |
| | | 4.75 | × | × | ○ | × | × | ○ | × | × | ○ | × | × | ○ | × | × | ○ | × | × | ○ |
| | | 6 | × | × | ○ | × | × | ○ | × | × | ○ | × | × | ○ | × | × | ○ | × | × | ○ |
| 2 | | 1 | × | × | ○ | × | × | ○ | × | × | ○ | × | × | ○ | × | × | ○ | × | × | ○ |
| | | 2.25 | × | × | ○ | × | × | ○ | × | × | ○ | × | × | ○ | × | × | ○ | × | × | ○ |
| | | 3.5 | × | × | ○ | × | × | ○ | × | × | ○ | × | × | ○ | × | × | ○ | × | × | ○ |
| | | 4.75 | × | × | ○ | × | × | ○ | × | × | ○ | × | × | ○ | × | × | ○ | × | × | ○ |
| | | 6 | × | × | ○ | × | × | ○ | × | × | ○ | × | × | ○ | × | × | ○ | × | × | ○ |

FIG. 21

| W/t | D/t = 0.6 | | | | | | | | | | | | | | | | | | | |
|---|---|---|---|---|---|---|---|---|---|---|---|---|---|---|---|---|---|---|---|---|
| | | | T_EL | | | | | | | | | | | | | | | | | |
| | | | 0.5 | | | 1 | | | 1.5 | | | 2 | | | 2.5 | | | 3 | | |
| | | | Z0 | NM | Vpi | Z0 | NM | Vpi | Z0 | NM | Vpi | Z0 | NM | Vpi | Z0 | NM | Vpi | Z0 | NM | Vpi |
| 0.2 | Gap/t | 1 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| | | 2.25 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| | | 3.5 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| | | 4.75 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| | | 6 | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| 0.5 | Gap/t | 1 | × | ○ | ○ | × | ○ | ○ | × | ○ | ○ | × | ○ | ○ | × | ○ | ○ | × | ○ | ○ |
| | | 2.25 | × | ○ | ○ | × | ○ | ○ | × | ○ | ○ | × | ○ | ○ | × | ○ | ○ | × | ○ | ○ |
| | | 3.5 | × | ○ | ○ | × | ○ | ○ | × | ○ | ○ | × | ○ | ○ | × | ○ | ○ | × | ○ | ○ |
| | | 4.75 | × | ○ | ○ | × | ○ | ○ | × | ○ | ○ | × | ○ | ○ | × | ○ | ○ | × | ○ | ○ |
| | | 6 | × | ○ | ○ | × | ○ | ○ | × | ○ | ○ | × | ○ | ○ | × | ○ | ○ | × | ○ | ○ |
| 0.8 | Gap/t | 1 | × | ○ | ○ | × | ○ | ○ | × | ○ | ○ | × | ○ | ○ | × | ○ | ○ | × | ○ | ○ |
| | | 2.25 | × | ○ | ○ | × | ○ | ○ | × | ○ | ○ | × | ○ | ○ | × | ○ | ○ | × | ○ | ○ |
| | | 3.5 | × | ○ | ○ | × | ○ | ○ | × | ○ | ○ | × | ○ | ○ | × | ○ | ○ | × | ○ | ○ |
| | | 4.75 | × | ○ | ○ | × | ○ | ○ | × | ○ | ○ | × | ○ | ○ | × | ○ | ○ | × | ○ | ○ |
| | | 6 | × | ○ | ○ | × | ○ | ○ | × | ○ | ○ | × | ○ | ○ | × | ○ | ○ | × | ○ | ○ |
| 1.1 | Gap/t | 1 | × | × | ○ | × | ○ | ○ | × | ○ | ○ | × | ○ | ○ | × | ○ | ○ | × | ○ | ○ |
| | | 2.25 | × | × | ○ | × | × | ○ | × | × | ○ | × | × | ○ | × | ○ | ○ | × | ○ | ○ |
| | | 3.5 | × | × | ○ | × | × | ○ | × | × | ○ | × | × | ○ | × | × | ○ | × | ○ | ○ |
| | | 4.75 | × | × | ○ | × | × | ○ | × | × | ○ | × | × | ○ | × | × | ○ | × | × | ○ |
| | | 6 | × | × | ○ | × | × | ○ | × | × | ○ | × | × | ○ | × | × | ○ | × | × | ○ |
| 1.4 | Gap/t | 1 | × | × | ○ | × | × | ○ | × | × | ○ | × | × | ○ | × | ○ | ○ | × | ○ | ○ |
| | | 2.25 | × | × | ○ | × | × | ○ | × | × | ○ | × | × | ○ | × | × | ○ | × | × | ○ |
| | | 3.5 | × | × | ○ | × | × | ○ | × | × | ○ | × | × | ○ | × | × | ○ | × | × | ○ |
| | | 4.75 | × | × | ○ | × | × | ○ | × | × | ○ | × | × | ○ | × | × | ○ | × | × | ○ |
| | | 6 | × | × | ○ | × | × | ○ | × | × | ○ | × | × | ○ | × | × | ○ | × | × | ○ |
| 1.7 | Gap/t | 1 | × | × | ○ | × | × | ○ | × | × | ○ | × | × | ○ | × | × | ○ | × | × | ○ |
| | | 2.25 | × | × | ○ | × | × | ○ | × | × | ○ | × | × | ○ | × | × | ○ | × | × | ○ |
| | | 3.5 | × | × | ○ | × | × | ○ | × | × | ○ | × | × | ○ | × | × | ○ | × | × | ○ |
| | | 4.75 | × | × | ○ | × | × | ○ | × | × | ○ | × | × | ○ | × | × | ○ | × | × | ○ |
| | | 6 | × | × | ○ | × | × | ○ | × | × | ○ | × | × | ○ | × | × | ○ | × | × | ○ |
| 2 | Gap/t | 1 | × | × | ○ | × | × | ○ | × | × | ○ | × | × | ○ | × | × | ○ | × | × | ○ |
| | | 2.25 | × | × | ○ | × | × | ○ | × | × | ○ | × | × | ○ | × | × | ○ | × | × | ○ |
| | | 3.5 | × | × | ○ | × | × | ○ | × | × | ○ | × | × | ○ | × | × | ○ | × | × | ○ |
| | | 4.75 | × | × | ○ | × | × | ○ | × | × | ○ | × | × | ○ | × | × | ○ | × | × | ○ |
| | | 6 | × | × | ○ | × | × | ○ | × | × | ○ | × | × | ○ | × | × | ○ | × | × | ○ |

FIG. 22

| W/t | D/t | | | | | | | | | | | | | | | | | | | |
|---|---|---|---|---|---|---|---|---|---|---|---|---|---|---|---|---|---|---|---|---|
| | | | 0.8 | | | | | | | | | | | | | | | | | |
| | | | $T_{EL}$ | | | | | | | | | | | | | | | | | |
| | | | 0.5 | | | 1 | | | 1.5 | | | 2 | | | 2.5 | | | 3 | | |
| | | | Z0 | NM | Vpi | Z0 | NM | Vpi | Z0 | NM | Vpi | Z0 | NM | Vpi | Z0 | NM | Vpi | Z0 | NM | Vpi |
| 0.2 | Gap/t | 1 | ▨ | ▨ | ▨ | ▨ | ▨ | ▨ | ▨ | ▨ | ▨ | ▨ | ▨ | ▨ | ▨ | ▨ | ▨ | ▨ | ▨ | ▨ |
| | | 2.25 | ▨ | ▨ | ▨ | ▨ | ▨ | ▨ | ▨ | ▨ | ▨ | ▨ | ▨ | ▨ | ▨ | ▨ | ▨ | ▨ | ▨ | ▨ |
| | | 3.5 | ▨ | ▨ | ▨ | ▨ | ▨ | ▨ | ▨ | ▨ | ▨ | ▨ | ▨ | ▨ | ▨ | ▨ | ▨ | ▨ | ▨ | ▨ |
| | | 4.75 | ▨ | ▨ | ▨ | ▨ | ▨ | ▨ | ▨ | ▨ | ▨ | ▨ | ▨ | ▨ | ▨ | ▨ | ▨ | ▨ | ▨ | ▨ |
| | | 6 | ▨ | ▨ | ▨ | ▨ | ▨ | ▨ | ▨ | ▨ | ▨ | ▨ | ▨ | ▨ | ▨ | ▨ | ▨ | ▨ | ▨ | ▨ |
| 0.5 | Gap/t | 1 | × | ○ | ○ | × | ○ | ○ | × | ○ | ○ | × | ○ | ○ | × | ○ | ○ | × | ○ | ○ |
| | | 2.25 | × | ○ | ○ | × | ○ | ○ | × | ○ | ○ | × | ○ | ○ | × | ○ | ○ | × | ○ | ○ |
| | | 3.5 | × | ○ | ○ | × | ○ | ○ | × | ○ | ○ | × | ○ | ○ | × | ○ | ○ | × | ○ | ○ |
| | | 4.75 | × | ○ | ○ | × | ○ | ○ | × | ○ | ○ | × | ○ | ○ | × | ○ | ○ | × | ○ | ○ |
| | | 6 | × | ○ | ○ | × | ○ | ○ | × | ○ | ○ | × | ○ | ○ | × | ○ | ○ | × | ○ | ○ |
| 0.8 | Gap/t | 1 | × | ○ | ○ | × | ○ | ○ | × | ○ | ○ | × | ○ | ○ | × | ○ | ○ | × | ○ | ○ |
| | | 2.25 | × | ○ | ○ | × | ○ | ○ | × | ○ | ○ | × | ○ | ○ | × | ○ | ○ | × | ○ | ○ |
| | | 3.5 | × | ○ | ○ | × | ○ | ○ | × | ○ | ○ | × | ○ | ○ | × | ○ | ○ | × | ○ | ○ |
| | | 4.75 | × | ○ | ○ | × | ○ | ○ | × | ○ | ○ | × | ○ | ○ | × | ○ | ○ | × | ○ | ○ |
| | | 6 | × | ○ | ○ | × | ○ | ○ | × | ○ | ○ | × | ○ | ○ | × | ○ | ○ | × | ○ | ○ |
| 1.1 | Gap/t | 1 | × | ○ | ○ | × | ○ | ○ | × | ○ | ○ | × | ○ | ○ | × | ○ | ○ | × | ○ | ○ |
| | | 2.25 | × | × | ○ | × | × | ○ | × | ○ | ○ | × | ○ | ○ | × | ○ | ○ | × | ○ | ○ |
| | | 3.5 | × | × | ○ | × | × | ○ | × | × | ○ | × | ○ | ○ | × | ○ | ○ | × | ○ | ○ |
| | | 4.75 | × | × | ○ | × | × | ○ | × | × | ○ | × | ○ | ○ | × | ○ | ○ | × | ○ | ○ |
| | | 6 | × | × | ○ | × | × | ○ | × | × | ○ | × | ○ | ○ | × | ○ | ○ | × | ○ | ○ |
| 1.4 | Gap/t | 1 | × | × | ○ | × | × | ○ | × | ○ | ○ | × | ○ | ○ | × | ○ | ○ | × | ○ | ○ |
| | | 2.25 | × | × | ○ | × | × | ○ | × | × | ○ | × | × | ○ | × | × | ○ | × | × | ○ |
| | | 3.5 | × | × | ○ | × | × | ○ | × | × | ○ | × | × | ○ | × | × | ○ | × | × | ○ |
| | | 4.75 | × | × | ○ | × | × | ○ | × | × | ○ | × | × | ○ | × | × | ○ | × | × | ○ |
| | | 6 | × | × | ○ | × | × | ○ | × | × | ○ | × | × | ○ | × | × | ○ | × | × | ○ |
| 1.7 | Gap/t | 1 | × | × | ○ | × | × | ○ | × | × | ○ | × | × | ○ | × | × | ○ | × | ○ | ○ |
| | | 2.25 | × | × | ○ | × | × | ○ | × | × | ○ | × | × | ○ | × | × | ○ | × | × | ○ |
| | | 3.5 | × | × | ○ | × | × | ○ | × | × | ○ | × | × | ○ | × | × | ○ | × | × | ○ |
| | | 4.75 | × | × | ○ | × | × | ○ | × | × | ○ | × | × | ○ | × | × | ○ | × | × | ○ |
| | | 6 | × | × | ○ | × | × | ○ | × | × | ○ | × | × | ○ | × | × | ○ | × | × | ○ |
| 2 | Gap/t | 1 | × | × | ○ | × | × | ○ | × | × | ○ | × | × | ○ | × | × | ○ | × | × | ○ |
| | | 2.25 | × | × | ○ | × | × | ○ | × | × | ○ | × | × | ○ | × | × | ○ | × | × | ○ |
| | | 3.5 | × | × | ○ | × | × | ○ | × | × | ○ | × | × | ○ | × | × | ○ | × | × | ○ |
| | | 4.75 | × | × | ○ | × | × | ○ | × | × | ○ | × | × | ○ | × | × | ○ | × | × | ○ |
| | | 6 | × | × | ○ | × | × | ○ | × | × | ○ | × | × | ○ | × | × | ○ | × | × | ○ |

LIGHT CONTROL DEVICE

TECHNICAL FIELD

The present invention relates to a light control device and, particularly, to a light control device having an electro-optical effect, which includes a thin plate having a thickness of 10 μm or less, an optical waveguide formed in the thin plate, and a controlling electrode for controlling light which passes through the optical waveguide, and in which at least a part of a signal path formed by a signal electrode among controlling electrodes becomes high impedance of 70Ω or more.

BACKGROUND ART

Conventionally, in the field of optical communication or optical measurement, various light control devices such as a waveguide type optical modulator or a waveguide type optical switch where an optical waveguide or a controlling electrode is formed on a substrate having an electro-optical effect have become commercially available.

Most shapes of the light control device which is being used currently, as shown in FIG. 1(a), includes an optical waveguide 2 or a signal electrode 4 and a grounding electrode 5 which are formed on an electro-optical crystal substrate 1 having a thickness of about 0.5 to 1 mm. In addition, FIG. 1(a) illustrates an example of the optical modulator using a Z-axis cut substrate, and reference numeral 3 indicates a buffer layer such as $SiO_2$ film.

Specifically, in the waveguide type optical modulator, a microwave signal is applied to the controlling electrode in order to control to modulate an optical wave propagated in the optical waveguide. Therefore, there is a need for achieving an impedance matching between a signal path, such as a coaxial cable which introduces microwaves into the optical modulator, and the controlling electrode in the optical modulator such that the microwave is efficiently propagated in the controlling electrode.

For this reason, as shown in FIG. 1(a), a shape of controlling electrode where a strip-shaped signal electrode 4 is interposed between grounding electrodes 5, that is, a coplanar type controlling electrode has been used.

However, in the case of the coplanar type controlling electrode, since an external electric field does not operate efficiently in a direction (corresponding to a vertical direction in the case of the Z-axis cut substrate shown in FIG. 1(a)) of high efficiency in the electro-optical effect of the substrate 1, a larger voltage is required in order to obtain a required optical modulation degree. Specifically, when a substrate made of $LiNbO_3$ (hereinafter, referred to as "LN") is used, and when an electrode length along the optical waveguide is 1 cm, a half-wavelength voltage of about 10 to 15 V is required.

As shown in FIG. 1(b), Patent Document 1 discloses a configuration that the optical waveguide is formed of a ridge type waveguide 20 and the grounding electrodes 5, 51, and 52 are disposed closer to the signal electrodes 4 and 41 in order to enhance an optical confinement of the optical waveguide and to more efficiently apply an electric field generated by the controlling electrode to the optical waveguide. With this configuration, it is possible to realize a reduction in driving voltage to some degree but it is essential to reduce the driving voltage further more in order to realize a high-speed modulation in a high-frequency band.

[Patent Document 1] U.S. Pat. No. 6,580,843

In addition, as shown in FIG. 1(c), Patent Document 2 discloses that the substrate is interposed between the controlling electrodes, and the electric field is applied in a direction (corresponding to a vertical direction in the case of the Z-axis cut substrate shown in FIG. 1(c)) of high efficiency in the electro-optical effect. Moreover, the optical modulator shown in FIG. 1(c) polarizes reversely the substrate having the electro-optical effect, and forms substrate regions 10 and 11 which are different from each other in a direction (a direction of arrow in FIG. 1(c)) of a spontaneous polarization, and the optical waveguide 2 is formed in each substrate region. When the electric field is applied to each optical waveguide by the common signal electrode 42 and the grounding electrode 53, it is possible to generate a phase variation in an opposite direction with respect to the optical wave propagated in each optical waveguide. Using this differential driving, it is possible to reduce the driving voltage further more.

[Patent Document 2] Japanese Patent Application No. 3638300

However, in the electrode structure shown in FIG. 1(c), a refraction index of the microwave becomes high, and thus it is difficult to realize a velocity matching between the optical wave which is propagated in the optical waveguide and the microwave which is a modulation signal. Moreover, since the impedance is reduced on the contrary, there is a drawback that it is difficult to achieve the impedance matching with the signal path of the microwave.

In addition, as the light control device using the polarization reversal, Patent Document 3 discloses a configuration that the signal electrode which configures the controlling electrode is branched into two or more in the middle of the path, and applies the same signal electric field to plural optical waveguides.

[Patent Document 3] Japanese Unexamined Patent Application Publication No. 2003-202530

In Patent Document 3, as shown in FIG. 2(a), a part of the Z-axis cut substrate is polarized reversely, a Mach-Zehnder optical waveguide (100, 101, and 102) is formed on the substrate, and further signal electrodes 103, 104 and 105 or grounding electrodes 106, 107 and 108 are disposed. The signal electrode is branched into two in the middle of the path to form two branched signal paths (signal electrodes 104 and 105).

In addition, FIG. 2(b) is a cross-sectional view taken on a dotted line A of FIG. 2(a). The branched waveguides 101 and 102 are disposed in different polarized regions (110, 111) in the Z-axis cut substrate, respectively.

As described above, when the signal path is branched into the multiple in the middle of the path, the signal paths are necessary to be set to have different impedances, for example, 50Ω for the signal path of the signal electrode 103, and 100Ω for the branched signal path of the branched signal electrodes 104 and 105 even though the signal paths are in the same light control device. Further, the branched signal path is required to be adjusted to have a very high impedance of 70Ω or more.

For this reason, it is very difficult to obtain the reduction in driving voltage or the velocity matching between the microwave and the optical wave while adjusting such impedances.

On the other hand, in the following Patent Documents 4 and 5, the optical waveguide and a modulation electrode are formed integrally in a very thin plate which has a thickness of 30 μm or less, and another substrate which has lower permittivity than the thin plate is bonded, so that an effective refraction index for the microwave is lowered and the velocity matching between the microwave and the optical wave is achieved.

[Patent Document 4] Japanese Unexamined Patent Application Publication No. 64-18121

[Patent Document 5] Japanese Unexamined Patent Application Publication No. 2003-215519

However, even though the controlling electrode is formed in the structure as illustrated in FIGS. 1(a) to 1(c) with respect to the optical modulator using such thin plate, the above-mentioned problems have still not been resolved fundamentally. When the substrate is interposed between the controlling electrodes shown in FIG. 1(c), the refraction index of the microwave tends to be decreased if the thickness of the substrate is thin, but it is difficult to realize the velocity matching between the optical wave and the microwave. Even though it depends on a width of the electrode, for example, when a thin plate made of LN is used, the effective refraction index is about 5 which does not come up to an optimal value of 2.14. On the other hand, the impedance tends to be decreased as the thickness of the substrate becomes thinner, which causes a mismatching in impedance to be large.

DISCLOSURE OF THE INVENTION

Problem to be Solved by the Invention

An advantage of some aspects of the present invention is to solve the above-mentioned problems and to provide a light control device, which is possible to realize a velocity matching between a microwave and an optical wave or an impedance matching of the microwaves even though a signal path having a high impedance of 70Ω or more is required, and is possible to reduce a driving voltage.

In addition, another advantage of some aspects of the present invention is to provide the light control device which can operate stably and suppress a rise in temperature of the light control device thanks to the reduction in driving voltage, and further to provide the light control device which can use a low-driving-voltage driving device which is inexpensive.

Means for Solving the Problem

In order to solve the above-mentioned problems, according to the invention of Claim 1, there is provided a light control device having an electro-optical effect, comprising a thin plate having a thickness of 10 µm or less, an optical waveguide formed in the thin plate, and a controlling electrode for controlling light which passes through the optical waveguide, wherein the controlling electrode includes a first electrode and a second electrode which are disposed so as to interpose the thin plate, wherein the first electrode has a coplanar type electrode structure which includes at least a signal electrode and a grounding electrode, wherein the second electrode includes at least a grounding electrode and is configured so as to apply an electric field to the optical waveguide in corporation with the signal electrode of the first electrode, and wherein the signal electrode of the first electrode includes a branched signal path in which at least one signal path is branched into two or more in the middle of the path.

The term "coplanar type electrode" of the present invention means a strip-shaped signal electrode interposed between grounding electrodes. For example, the signal electrodes are formed as plural strip lines, and the plural strip lines are interposed between the grounding electrodes, or further the grounding electrodes are additionally disposed between the plural strip lines in the "coplanar type electrode."

According to the invention of Claim 2, in the above-mentioned light control device described in Claim 1, the thin plate in at least a part of an operation region in the thin plate where an electric field by the branched signal path operates is polarized reversely.

According to the invention of Claim 3, in the above-mentioned light control device described in Claim 1 or 2, the optical waveguide is a ridge type optical waveguide.

According to the invention of Claim 4, in the above-mentioned light control device described in any one of Claims 1 to 3, a buffer layer is formed between the thin plate and the first electrode or the second electrode.

According to the invention of Claim 5, in the above-mentioned light control device described in any one of Claims 1 to 4, the signal electrode or the grounding electrode includes a transparent electrode or an electrode in which a transparent electrode is disposed on the side of thin plate.

According to the invention of Claim 6, in the above-mentioned light control device described in any one of Claims 3 to 5, recesses which are disposed on the both sides of at least the ridge type waveguide are filled with a low-permittivity film.

According to the invention of Claim 7, in the above-mentioned light control device described in Claim 6, a signal line for feeding the signal electrode is disposed so as to pass through a position above or below the grounding electrode of the first electrode, and a low-permittivity film is disposed between the signal line and the grounding electrode.

According to the invention of Claim 8, in the above-mentioned light control device described in any one of Claims 1 to 7, the second electrode is a patterning electrode which has a shape corresponding to that of the optical waveguide.

According to the invention of Claim 9, in the above-mentioned light control device described in any one of Claims 1 to 8, a grounding electrode of the first electrode is electrically connected with the grounding electrode of the second electrode.

According to the invention of Claim 10, in the above-mentioned light control device described in Claim 9, the grounding electrode of the first electrode is electrically connected with the grounding electrode of the second electrode via a through hole provided in the thin plate.

According to the invention of Claim 11, in the above-mentioned light control device described in any one of Claims 1 to 10, the thin plate is bonded to a support substrate via an adhesion layer so as to interpose the first electrode or the second electrode.

According to the invention of Claim 12, in the above-mentioned light control device described in any one of Claims 1 to 10, further comprising a support substrate which reinforces the thin plate, wherein the first electrode or the second electrode is disposed on the support substrate.

According to the invention of Claim 13, in the above-mentioned light control device described in any one of Claims 1 to 12, an impedance of the branched signal path is 70Ω or more.

According to the invention of Claim 14, in the above-mentioned light control device described in Claim 13, at least a width W, a height $T_{EL}$ of the signal electrode of the branched signal path, a gap G between the signal electrode and the grounding electrode, and a depth D of a ridge when the optical waveguide is a ridge type optical waveguide are set such that a half-wavelength voltage Vpai in the branched signal path is 12 V·cm or less, an impedance Z is 70Ω or more and 130Ω or less, and a product of a reflection difference Δn between a light and a microwave and a length L of an operation portion where an electric field of the branched signal path operates to the optical waveguide is 1.3 cm or less.

EFFECT OF THE INVENTION

According to the invention of Claim 1, a light control device having an electro-optical effect, comprises a thin plate having a thickness of 10 μm or less, an optical waveguide formed in the thin plate, and a controlling electrode for controlling light which passes through the optical waveguide, wherein the controlling electrode includes a first electrode and a second electrode which are disposed so as to interpose the thin plate, wherein the first electrode has a coplanar type electrode structure which includes at least a signal electrode and a grounding electrode, wherein the second electrode includes at least a grounding electrode and is configured so as to apply an electric field to the optical waveguide in corporation with the signal electrode of the first electrode, and wherein the signal electrode of the first electrode includes a branched signal path in which at least one signal path is branched into two or more in the middle of the path. Therefore, with respect to the light control device having a branched signal path of high impedance, a velocity matching between a microwave and an optical wave or an impedance matching of the microwaves can be realized, and it is possible to provide the light control device capable of operating in high speed. Moreover, since a driving voltage can be reduced, it is possible to drive the light control device in high speed using an existing low-cost driving device, and thus the cost for the driving device can be reduced.

According to the invention of Claim 2, since the thin plate is polarized reversely, at least a part of an operation region in the thin plate where an electric field by the branched signal path operates can give rise to different optical modulations on the optical waveguide formed in the thin plate when an electric field is applied in the same direction, and a differential driving of the light control device can be easily realized by a simple controlling electrode or a driving circuit, and thus it is also possible to reduce a driving voltage.

According to the invention of Claim 3, the optical waveguide is a ridge type optical waveguide. Therefore, an optical confinement factor is high, and it is possible to concentrate an electric field formed by the controlling electrode into the optical waveguide, and thus the light control device having further low driving voltage can be realized.

According to the invention of Claim 4, a buffer layer is formed between the thin plate and the first electrode or the second electrode. Therefore, it is possible that the controlling electrode is disposed closer to the optical waveguide while suppressing a propagation loss in the optical wave propagated in the optical waveguide.

According to the invention of Claim 5, the signal electrode or the grounding electrode includes a transparent electrode or an electrode in which a transparent electrode is disposed on the side of the thin plate. Therefore, even if there is no buffer layer, it is possible that the controlling electrode is disposed further closer to the optical waveguide while suppressing a propagation loss in the optical wave propagated in the optical waveguide.

According to the invention of Claim 6, recesses which are disposed on the both sides of at least the ridge type waveguide are filled with a low-permittivity film. Therefore, it is possible to adjust a microwave refraction index or impedance of the controlling electrode, and thus a further proper refraction index or impedance of the microwave can be obtained.

According to the invention of Claim 7, a signal line for feeding the signal electrode is disposed so as to pass through a position above or below the grounding electrode of the first electrode, and a low-permittivity film is disposed between the signal line and the grounding electrode. Therefore, flexibility in wiring of the controlling electrode is increased, and it is also possible to achieve a complex wiring such as an optical integrated circuit. In addition, the wiring can be performed in three dimensions, and thus a further proper refraction index or impedance of the microwave can be obtained.

According to the invention of Claim 8, the second electrode is a patterning electrode which has a shape corresponding to that of the optical waveguide. Therefore, the electric field applied to the optical waveguide can be further concentrated, and the driving voltage can be further lowered.

According to the invention of Claim 9, a grounding electrode of the first electrode is electrically connected with a grounding electrode of the second electrode. Therefore, a deviation in floating charges generated in a grounding electrode of the first electrode and a grounding electrode of the second electrode can be suppressed, and thus a further proper electric field can be applied to the optical waveguide.

According to the invention of Claim 10, the grounding electrode of the first electrode is electrically connected with the grounding electrode of the second electrode via a through hole provided in the thin plate. Therefore, it is possible to apply the proper electric field described above to the optical waveguide, and an electric wiring for the light control device can be simplified.

According to the invention of Claim 11, the thin plate is bonded to a support substrate via an adhesion layer so as to interpose the first electrode or the second electrode. Therefore, a mechanical strength of the thin plate can be reinforced, and thus it is possible to provide the light control device with high reliability.

According to the invention of Claim 12, the light control device further comprises a support substrate which reinforces the thin plate, the first electrode or the second electrode is disposed on the support substrate. Therefore, flexibility in arrangement of the controlling electrode increases, and it is also possible to achieve a complex wiring such as an optical integrated circuit. Moreover, the number of the controlling electrodes disposed on the thin plate can be reduced, and thus it can reduce a risk of damage on the thin plate due to a thermal stress or the like on the thin plate.

According to the invention of Claim 13, an impedance of the branched signal path is 70Ω or more. Therefore, with respect to the light control device having a signal path of high impedance, the velocity matching between the microwave and the optical wave or the impedance matching of the microwaves can be realized, and it is possible to provide the light control device capable of operating in high speed. Moreover, since the driving voltage can be reduced, it is possible to drive the light control device in high speed using an existing low-cost driving device, and thus the cost for the driving device can be reduced.

According to the invention of Claim 14, at least a width W, a height $T_{EL}$ of the signal electrode of the branched signal path, a gap G between the signal electrode and the grounding electrode, and a depth D of a ridge when the optical waveguide is a ridge type optical waveguide are set such that a half-wavelength voltage Vpai in the branched signal path is 12 V·cm or less, an impedance Z is 70Ω or more and 130Ω or less, and a product of a reflection difference Δn between a light and a microwave and a length L of an operation portion where an electric field of the branched signal path operates to the optical waveguide is 1.3 cm or less. Therefore, with respect to the light control device having a high impedance signal path, it is possible to very easily realize the velocity matching between the microwave and the optical wave or the impedance matching of the microwaves only by adjusting a width or a height of the signal electrode or a gap between the signal electrode and the grounding electrode or a depth of the ridge or the like, and it is possible to provide the light control device capable of operating in high speed. Moreover, since the driving voltage can be reduced, it is possible to drive the light control device in high speed using an existing low-cost driving device, and thus the cost for the driving device can be reduced.

BRIEF DESCRIPTION OF THE DRAWINGS

FIG. 2 is a diagram exemplarily illustrating a light control device using a branched signal path.

FIG. 11 is a table illustrating a simulation result (t=2 μm, D/t=0.2).

FIG. 12 is a table illustrating a simulation result (t=2 μm, D/t=0.4).

FIG. 13 is a table illustrating a simulation result (t=2 μm, D/t=0.6).

FIG. 14 is a table illustrating a simulation result (t=2 μm, D/t=0.8).

FIG. 15 is a table illustrating a simulation result (t=4 μm, D/t=0.2).

FIG. 16 is a table illustrating a simulation result (t=4 μm, D/t=0.4).

FIG. 17 is a table illustrating a simulation result (t=4 μm, D/t=0.6).

FIG. 18 is a table illustrating a simulation result (t=4 μm, D/t=0.8).

FIG. 19 is a table illustrating a simulation result (t=10 μm, D/t=0.2).

FIG. 20 is a table illustrating a simulation result (t=10 μm, D/t=0.4).

FIG. 21 is a table illustrating a simulation result (t=10 μm, D/t=0.6).

FIG. 22 is a table illustrating a simulation result (t=10 μm, D/t=0.8).

DESCRIPTION OF REFERENCE NUMERALS AND SIGNS

Figure 1:
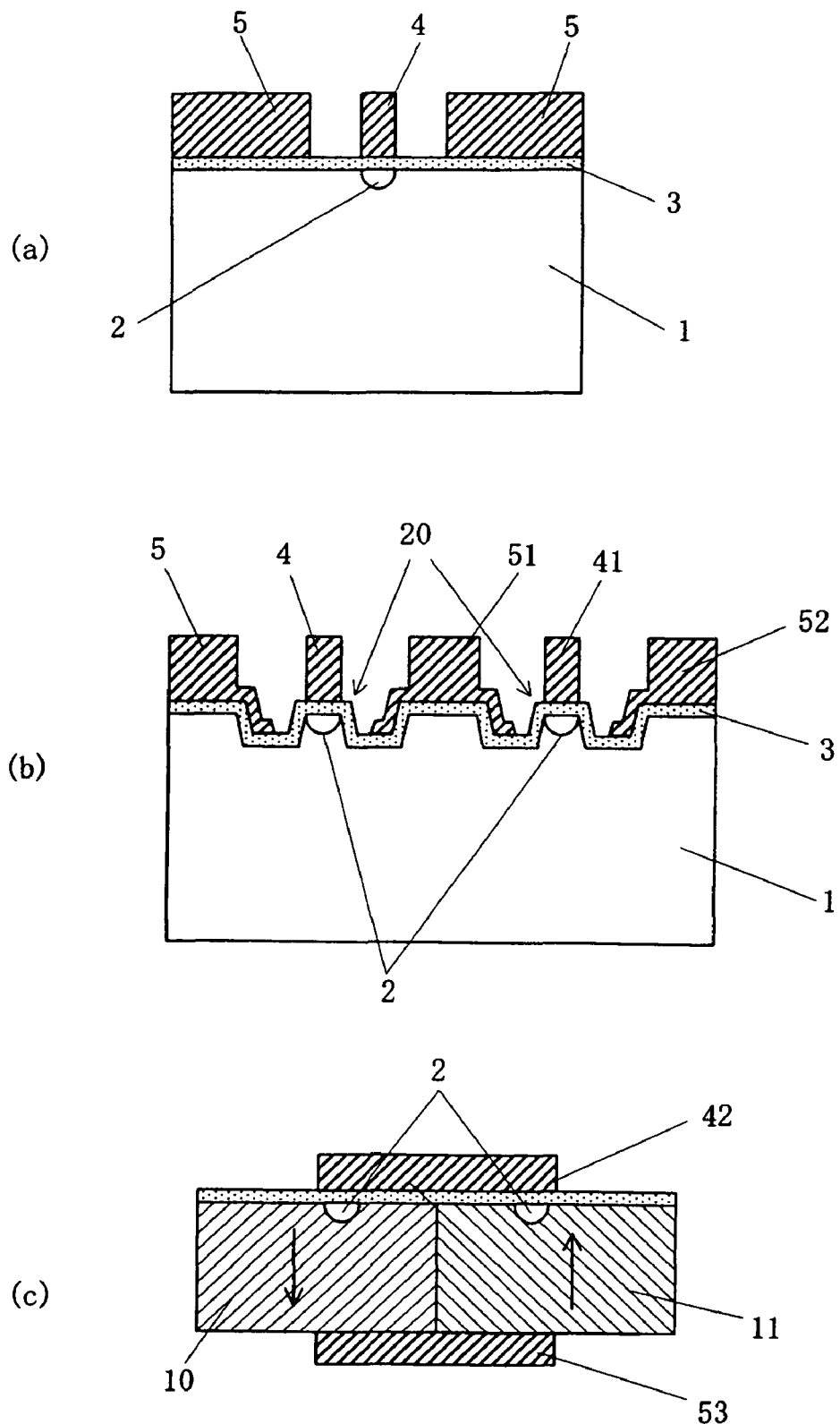
FIG. 1 is a diagram exemplarily illustrating a conventional light control device.

1: Z-axis cut crystal substrate
2: optical waveguide
3, 31: buffer layer
4, 41, 42: signal electrode
5, 51, 52, 53, 54: grounding electrode
6: adhesion layer
7: support substrate
8, 81: low-permittivity film
9, 91, 92, 93, 94: transparent electrode
11: X-axis cut crystal substrate
20: ridge type waveguide (ridge portion)
200: connection path formed in a through hole Best Mode for Carrying Out the Invention Hereinafter, embodiments of the present invention will be described in detail.

A basic configuration of a light control device according to the present invention is characterized by a light control device having an electro-optical effect, comprising a thin plate having a thickness of 10 μm or less, an optical waveguide formed in the thin plate, and a controlling electrode for controlling light which passes through the optical waveguide, wherein the controlling electrode includes a first electrode and a second electrode which are disposed so as to interpose the thin plate, wherein the first electrode has a coplanar type electrode structure which includes at least a signal electrode and a grounding electrode, wherein the second electrode includes at least a grounding electrode and is configured so as to apply an electric field to the optical waveguide in corporation with the signal electrode of the first electrode, and wherein the signal electrode of the first electrode includes a branched signal path in which at least one signal path is branched into two or more in the middle of the path.

Figure 3:
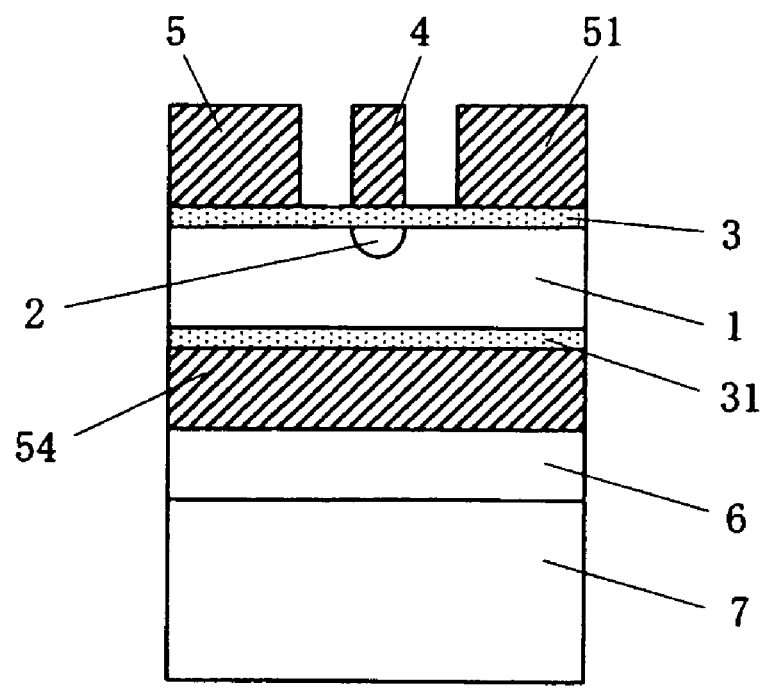
FIG. 3 is a diagram illustrating a light control device according to an embodiment of the present invention.

FIG. 3 is a cross-sectional view illustrating a light control device according to an embodiment of the present invention and, particularly, illustrating a part extracted from a branched signal path in which at least one signal path is branched into two or more in the middle of the path as shown in FIG. 2. In addition, FIG. 3 shows a case in which a Z-axis cut substrate (thin plate) 1 is used. If necessary, when a light control device in which an X-axis cut substrate is used includes a high impedance path such as the branched signal path, it is matter of course that the technique of the present invention is equally applicable.

A thickness of the thin plate of the light control device of the present invention is preferably 10 μm or less.

In FIG. 3, an optical waveguide 2 is formed in the thin plate 1 such that controlling electrodes are disposed so as to interpose the thin plate 1 therebetween. As the controlling electrode, there are a first electrode which is disposed on an upper side of the thin plate 1 and a second electrode which is disposed on a lower side of the thin plate. A signal electrode 4 and a grounding electrode 5 (51) are provided in the first electrode. Further, a grounding electrode 54 is provided in the second electrode. In the first and second electrodes, it is matte of course that required electrodes such as a DC electrode other than the shown electrodes can be suitably added.

The light control device shown in FIG. 3 is characterized in that not only an electric field by the signal electrode 4 and the grounding electrode 5 (51), but also an electric field by the signal electrode 4 and the grounding electrode 54 are also applied to the optical waveguide 2. In this way, an electric field in a vertical direction of the optical waveguide 2 shown in the drawing can be stronger, and thus it is also possible to reduce a driving voltage.

Moreover, since a refraction index and an impedance of a microwave in the controlling electrode is determined by the signal electrode 4 and the grounding electrodes 5 (51) and 54, for example, it is also possible to set the impedance value to 70Ω or more while realizing a refraction index of 2.14 that is an optimal value for the microwave.

Each electrode is disposed via a buffer layer 3 or 31 such as $SiO_2$ film which is disposed between each electrode and the thin plate. The buffer layer has an effect that prevents optical waves propagated in the optical waveguide from being absorbed or scattered by the controlling electrode. In addition, as a configuration of the buffer layer, an Si film or the like also can be formed integrally if necessary in order to reduce the pyroelectric effect of the thin plate 1.

In addition, the buffer layer between the grounding electrode 5 (51) or 54 and the thin plate 1 also can be omitted. However, for the buffer layer between the optical waveguide of the thin plate 1 and the grounding electrode 54, as a thickness of the thin plate becomes smaller, a mode diameter of the optical wave propagated in the optical waveguide becomes approximately equal to the thickness of the thin plate. Therefore, since absorption or scattering of the optical wave by the grounding electrode 54 also occurs, it is preferable that this portion of buffer layer be left.

Since a substrate of the light control device is a thin plate, as in the case of FIG. 3, it is possible to operate the light control device even though the first electrode and the second electrode are conversely disposed with respect to the thin plate 1.

The thin plate 1 is bonded to a support substrate 7 via an adhesion layer 6 after the second electrode is formed. Therefore, even though the thickness of the thin plate 1 is 10 μm or less, it is possible to secure an enough mechanical strength as the light control device.

In addition, as shown in FIG. 3, the second electrode (or the first electrode when the first electrode and the second electrode are conversely disposed) is disposed so as to come in contact with the thin plate 1. Therefore, it is also possible that the second electrode (or the first electrode) is formed on the support substrate 7 to be bonded to the thin plate 1 via the adhesion layer.

As a crystal substrate having the electro-optical effect which is used for the thin plate, for example, lithium niobate, lithium tantalite, PLZT (lead lanthanum zirconate titanate), silica-based materials, and a composition thereof are available. In particular, lithium niobate (LN) or lithium tantalite (LT) crystal with high electro-optical effect is preferably used.

As a method of manufacturing the optical waveguide, it is possible to form the optical waveguide by diffusing Ti or the like on a substrate surface through a thermal diffusion scheme or a proton-exchange scheme. In addition, as described in Patent Document 6, it is possible to form the optical waveguide by forming a ridge on the surface of the thin plate 1 so as to fit the shape of the optical waveguide.

It is possible to form the controlling electrode such as the signal electrode and the grounding electrode by a method of forming an electrode pattern of Ti.Au and a gold plating method, etc. In addition, for a transparent electrode to be described later, ITO or a compound oxide film of In and Ti which is an infrared-transparent conductive film is available. Further, a method of forming the electrode pattern through a photolithography technique and then using a liftoff technique, or a method of forming the electrode pattern in which a mask member is formed such that a predetermined electrode pattern is left and then subjected to a dry etching or a wet etching is available.

[Patent Document 6] Japanese Patent Application Laid-Open No. 06-289341

In a method of manufacturing the thin plate 1 including the light control device, the above-mentioned optical waveguide is formed on the substrate having a thickness of several hundreds μm, and a rear surface of the substrate is rubbed, so that the thin plate having a thickness of 10 μm or less is generated. Thereafter, the controlling electrode is formed in the surface of the thin plate. In addition, it is also possible to rub the rear surface of the substrate after forming the optical waveguide and the controlling electrode and the like. There may be a risk of damage on the thin plate when the thin plate undergoes a thermal impact caused from the formation of the optical waveguide or a mechanical impact caused from various processes. Therefore, it is preferable that a process likely to undergo these thermal or mechanical impacts is performed before the substrate is rubbed to be thin.

Material for the support substrate 7 can be used with various ones. For example, in addition to using the same material as the thin plate, it is possible to use low-permittivity materials than the thin plate, such as quartz, glass, and alumina, or materials having a crystal orientation different from the thin plate. However, in order to stabilize a modulation characteristic of the light control device with respect to a temperature variation, it is preferable that materials having the linear expansion coefficient equivalent to that of the thin plate be selected. On the contrary, in a case where it is difficult to select the equivalent material, it may select an adhesive with the linear expansion coefficient equivalent to that of the thin plate, which is used for bonding the thin plate with the support substrate.

As the adhesion layer 6, it is possible to use various adhesive materials, such as epoxy-based adhesive, thermosetting adhesive, ultraviolet curable adhesive, solder glass, and a thermosetting, a light curable or a light-induced viscosity resin adhesive sheet, to bond the thin plate 1 to the support substrate 7.

Hereinafter, applications of the light control device according to the present invention will be described. When the same member as the above-mentioned member is used in the drawings, the same reference numeral is used, and further the adhesive layer or the support substrate is omitted in order to describe characteristics of the configuration clearly.

(Light Control Device Using Ridge Type Waveguide)

Figure 4:
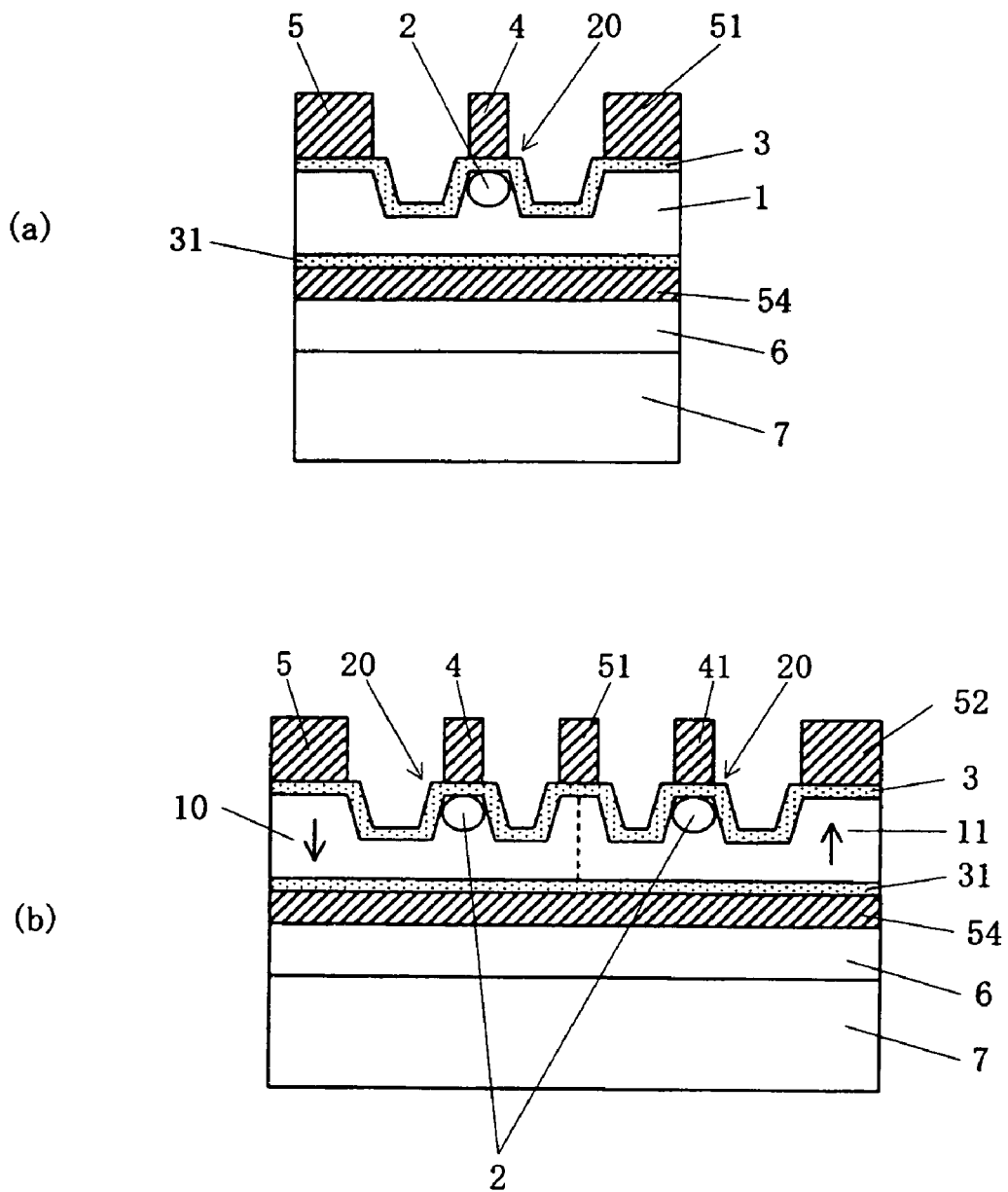
FIG. 4 is a diagram exemplarily illustrating a light control device including a ridge type waveguide.

FIG. 4 shows an application of the light control device of the present invention, which is an example where the optical waveguide is formed by the ridge type waveguide. By forming the optical waveguide with the ridge type optical waveguide, an optical confinement factor becomes higher and it is possible to concentrate an electric field generated by the controlling electrode into the optical waveguide. Therefore, it is possible to realize the light control device operated in a lower driving voltage.

FIG. 4(*a*) shows the light control device where the optical waveguide shown in FIG. 3 is formed as a ridge type waveguide 20, where the optical wave propagated in the ridge portion 20 is confined. Since the electric field generated by the signal electrode 4 and the grounding electrode 5 (51) and the electric field generated by the signal electrode 4 and the grounding electrode 54 are intensively applied to the ridge portion 20, it contributes to a decrease in driving voltage of the light control device.

FIG. 4(*b*) is a cross-sectional view illustrating the light control device including two branched signal paths as shown in FIG. 2(*b*), which is adopted with the structure of FIG. 4(*a*) according to the present invention.

FIG. 4(*b*) shows that two optical waveguides 2 are formed as the ridge type waveguide 20 and, a ridge portion corresponding to the grounding electrode 51 is formed between two optical waveguides. The signal electrodes 4 and 41 are disposed at locations corresponding to the ridge type waveguides 20, and the same signal is applied to the signal electrodes. However, since directions (10, 11) of polarization in the substrate are different from each other in each optical waveguide, a phase variation of the optical wave propagated in the optical waveguide is conversed and, as a result, it is possible to obtain the same effect such as that in a different driving.

In addition, when the left ridge portion 20 is observed, the electric field generated by the signal electrode 4 and the grounding electrode 5, the electric field generated by the signal electrode 4 and the grounding electrode 54, and further the electric field generated by the signal electrode 4 and the grounding electrode 51 are intensively applied.

(Light Control Device Having Low-Permittivity Film)

Figure 5:
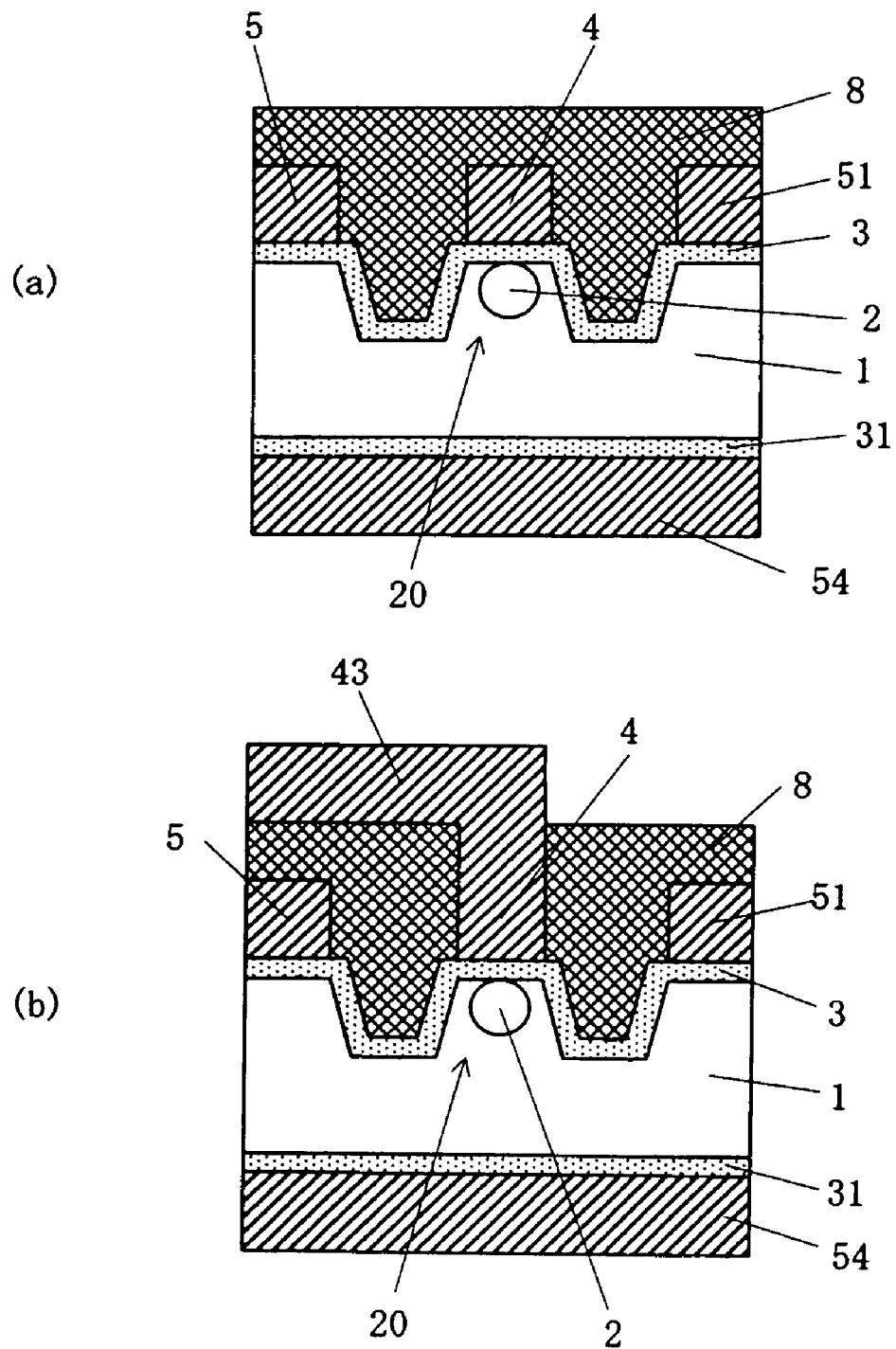
FIG. 5 is a diagram exemplarily illustrating a light control device including a low-permittivity film.

FIG. 5 shows an application of the light control device of the present invention, which is an example where recesses forming the ridge type waveguide and a low-permittivity film is disposed between the signal electrode 4 and the grounding electrode 5 (51) to be a first electrode. With this arrangement of the low-permittivity film, the refraction index or the impedance of a microwave can be adjusted in the controlling electrode, and flexibility in wiring of the controlling electrode can be increased.

As materials of the low-permittivity film, benzocyclobutene (BCB) or the like can be used, and as a method of manufacturing the low-permittivity film, a coating method can be used.

As shown in FIG. 5(a), the low-permittivity film 8 can be formed so as to coat recesses formed on both sides of the ridge type waveguide 20, portions between the signal electrode 4 and the grounding electrode 5 (51), or the first electrode.

In addition, as shown in FIG. 5(b), a power feeding portion 43 of the signal electrode 4 is disposed to pass through a position above the grounding electrode 5, and the low-permittivity film 8 is disposed between the grounding electrode 4 and the power feeding portion 43. Therefore, the controlling electrode can be wired in three dimensions, and thus the flexibility in wiring design related to the controlling electrode can be increased. Moreover, it is also possible that the grounding electrode is formed to pass through a position above the signal electrode (location away from the thin plate).

(Light Control Device where Optical Waveguide is Formed on the Rear Surface Side of the Thin Plate)

Figure 6:
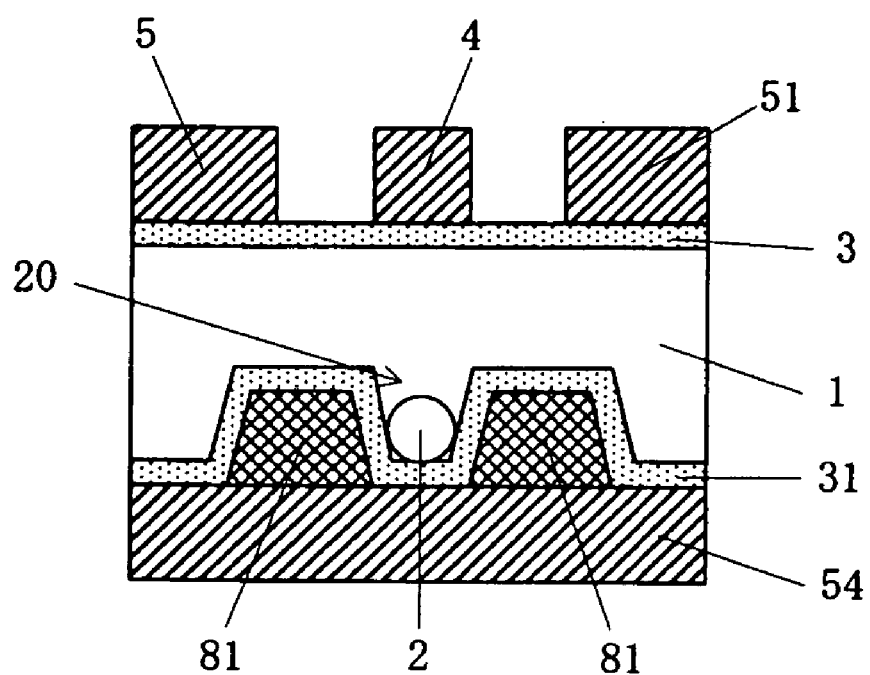
FIG. 6 is a diagram exemplarily illustrating a light control device in which an optical waveguide is formed at a rear surface side of a thin plate.

FIG. 6 shows an application of the light control device of the present invention, which is an example where the optical waveguide 2 (ridge type waveguide 20) is formed on the rear surface (lower portion of the drawing) of the thin plate 1.

When the thin plate having a thickness of 10 μm or less is used, as shown in FIG. 6, the optical waveguide 2 is formed on the rear surface of the thin plate 1, and the signal electrode 4 and the grounding electrode 5 (51) which are the first electrode are formed on the surface of the thin plate. Further, the grounding electrode 54 which is the second electrode is formed on the rear surface of the thin plate 1. Despite of the above-mentioned structure, the ridge portion 20 is possible to be applied with the electric field, especially, generated by the signal electrode 4 and the grounding electrode 54.

In addition, the low-permittivity films 81 are formed at the recesses which form the ridge portion 20, if necessary.

In the case of the light control device shown in FIG. 4, it is necessary to accurately dispose the signal electrode 4 or 41 on the top of the ridge portion of the ridge type waveguide. However, in the case of the light control device shown in FIG. 6, the electric field can be advantageously applied with efficiency to the ridge portion only by setting a width of the signal electrode 4 or 41 to be higher than that of the ridge type waveguide, even though a location displacement occurs slightly between the two.

(Light Control Device Using Transparent Electrode)

Figure 7:
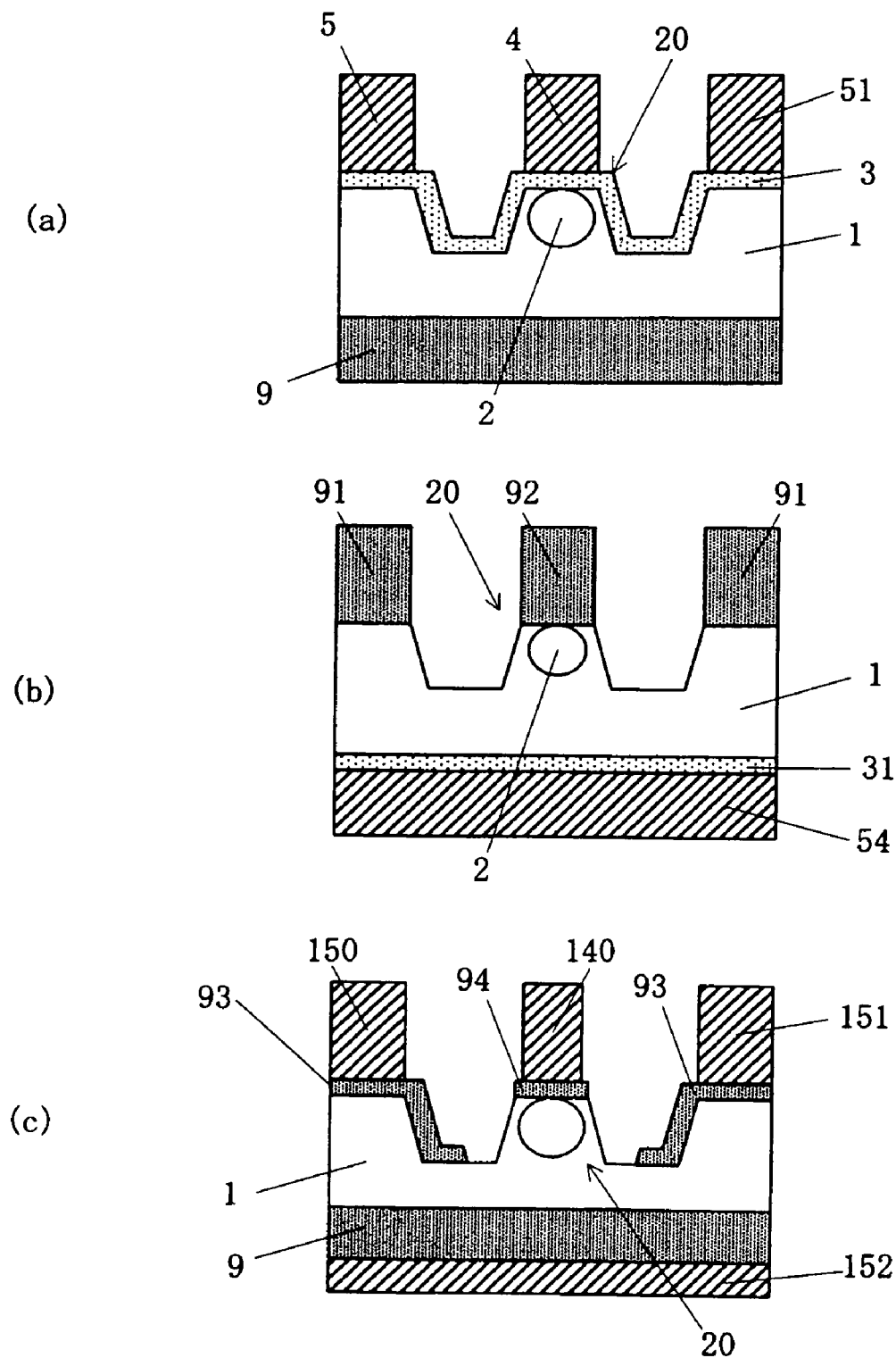
FIG. 7 is a diagram exemplarily illustrating a light control device using a transparent electrode.

FIG. 7 shows an application of the light control device of the present invention, which is an example where transparent electrodes (9 and 91 to 94) are used to the electrode. Using either an electrode where the transparent electrode is disposed on the signal electrode or the grounding electrode or an electrode where the transparent electrode is disposed on the thin plate, it is possible to dispose the controlling electrode further closer to the optical waveguide and to reduce the driving voltage while suppressing a propagation loss in the optical wave propagated in the optical waveguide even though there is no buffer layer.

FIG. 7(a) shows an example where the transparent electrode 9 is used as the grounding electrode of the second electrode and FIG. 7(b) shows an example where the transparent electrodes 91 and 92 are used as the first electrode. In these cases, the buffer layer 31 or 3 shown in FIG. 4(a) is unnecessary, and it is possible to dispose the electrode closer to the optical waveguide.

In addition, the grounding electrode (transparent electrode 91) configuring the first electrode shown in FIG. 7(b) may be formed as a typical metal electrode because there is no optical waveguide in the vicinity of the electrode.

FIG. 7(c) shows an example where the transparent electrode is used in a part (a side coming into contact with the thin plate 1) of the controlling electrode. In general, since the transparent electrode has high electrical resistivity in comparison with the metal electrode such as Au, it is possible to dispose the metal electrodes 140, 150, 151, and 152 by coming into contact with the transparent electrodes 9 or 93 to 94 for the purpose of reducing an electric resistance of an electrode.

In addition, it is also possible to dispose the transparent electrode close to the ridge type waveguide or at a side surface of the ridge type optical waveguide as shown by reference numeral 93.

(Light Control Device Using Patterning Electrode as the Second Electrode)

Figure 8:
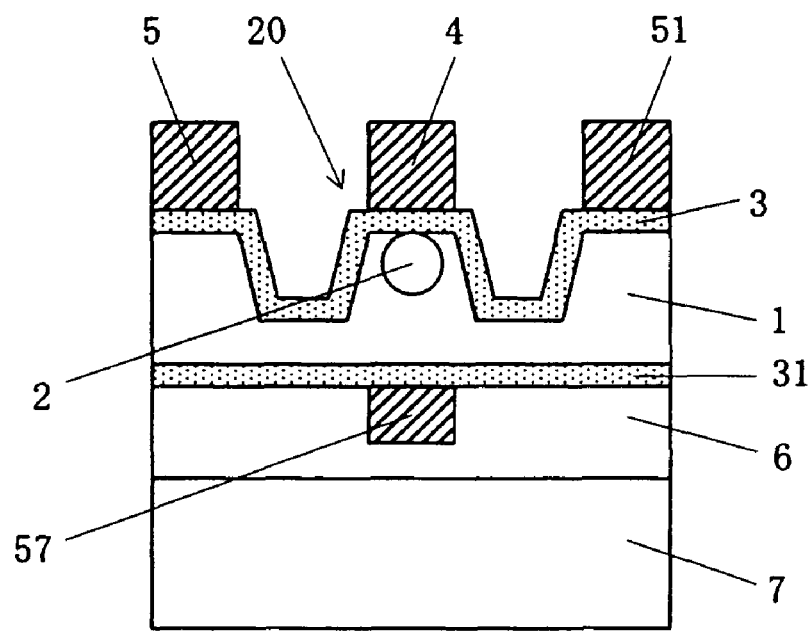
FIG. 8 is a diagram exemplarily illustrating a light control device using a patterning electrode as a second electrode.

FIG. 8 shows an application of the light control device of the present invention, which is an example where the grounding electrode to form the second electrode includes a patterning electrode. Since the second electrode is formed as the patterning electrode which has a shape corresponding to the shape of the optical waveguide, it is possible to adjust a shape of the electric field applied to the optical waveguide to be a proper shape, and thus it is possible to reduce the driving voltage further more.

In FIG. 8, the grounding electrode 57 is formed in a strip shape along the optical waveguide 2 and is configured to further concentrate the electric field generated by the signal electrode 4 and the grounding electrode 57 into the optical waveguide 2.

(Light Control Device Using Through Hole)

Figure 9:
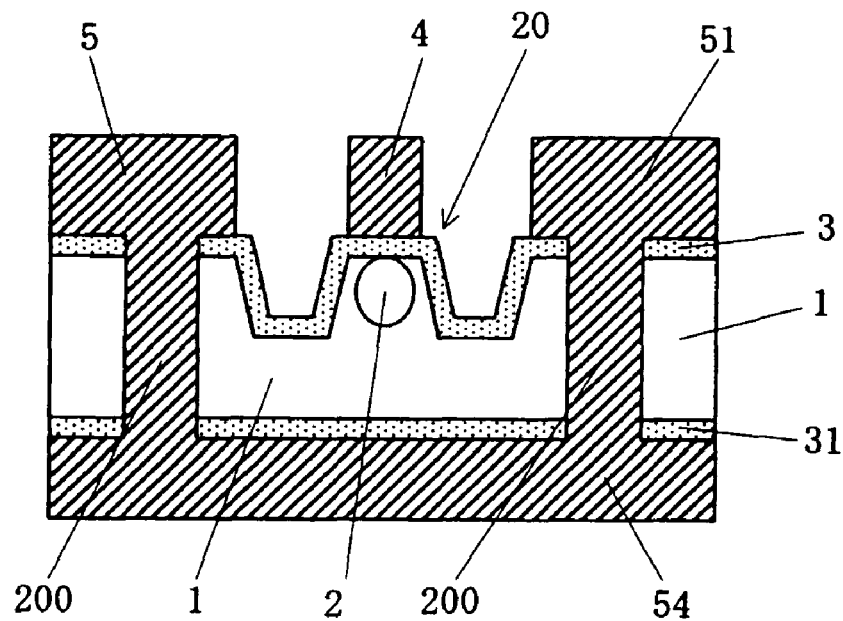
FIG. 9 is a diagram exemplarily illustrating a light control device using a through hole.

FIG. 9 shows an application of the light control device of the present invention, which is an example where a through hole is used for electrically connecting the grounding electrode of the first electrode with the grounding electrode of the second electrode. The grounding electrode of the first electrode and the grounding electrode of the second electrode are electrically connected to each other via the through hole provided in the thin plate. Therefore, an electric wiring for the light control device can be simplified and a variation in floating charges which is generated in the grounding electrode of the first electrode and the grounding electrode of the second electrode can be suppressed, and thus it is possible to apply a further proper electric field to the optical waveguide.

FIG. 9 shows an example using a Z-axis cut thin plate 1, where the grounding electrode 5 (51) of the first electrode and the grounding electrode 54 of the second electrode are kept in an electric conduction state by a connection path 200 which is disposed in the through hole of the thin plate 1.

The grounding electrode of the first electrode and the grounding electrode of the second electrode shown in FIGS.

3 to 8 are electrically conducted in the vicinity or at the outside of the thin plate. However, as the modulation signal frequency to be applied to the controlling electrode becomes higher, a deviation in timing is likely to occur in floating charges which is induced in the grounding electrode. For this reason, as shown in FIG. 9, it is possible to suppress the deviation in timing by conducting the two in the vicinity of the optical waveguide.

Embodiments

As described above in connection with configurations of the light control device of the present invention, when the controlling electrode includes the first electrode and the second electrode which are disposed so as to interpose the thin plate; the first electrode has a coplanar type electrode structure which includes at least the signal electrode and the grounding electrode; and the second electrode includes at least the grounding electrode and is configured so as to apply the electric field to the optical waveguide in corporation with the signal electrode of the first electrode, it has been confirmed by a simulation that the light control device which satisfies the following conditions required in a high impedance path can be designed by adjusting at least a width W, a height $T_{EL}$ of the signal electrode, and a gap G between the signal electrode and the grounding electrode, and a ridge depth D when the optical waveguide is the ridge type optical waveguide.

(Conditions of High Impedance Path)

(1) The half-wavelength voltage Vpai in the signal electrode is 12 V·cm or less (2) The impedance Z is 70Ω or more and 130Ω or less (3) The product of the reflection difference Δn between a light and a microwave and the length (operation length) L of an operation portion where the electric field of the signal path operates to the optical waveguide is 1.3 cm or less In addition, when Δn×L≦1.3 cm, an optical band of the light control device can be 10 GHz or more.

Figure 10:
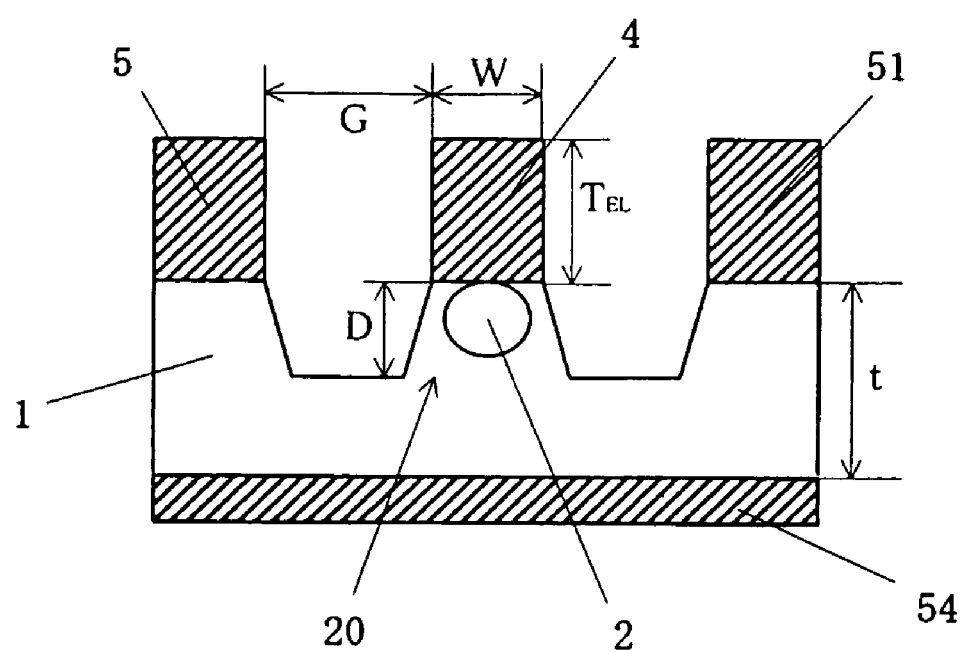
FIG. 10 is a diagram illustrating a model for a simulation.

It is assumed that a model for the simulation is the ridge type optical waveguide as shown in FIG. 10. A width of the signal electrode 4 is denoted by W, a gap between the signal electrode 4 and the grounding electrode 5 (51) is denoted by G, a height of the signal electrode 4 or the grounding electrode 5 (51) is denoted by $T_{EL}$, a depth of the ridge of the ridge type optical waveguide 20 is denoted by D, and a thickness of the substrate 1 is denoted by t.

The simulation was performed for three cases where the thickness t of the substrate is 2 μm, 4 μm, and 10 μm. Parameters are discretely set to numerals which become a condition in the following range.

(Width W of the Signal Electrode)

The width W of the signal electrode was set by using a value normalized with the thickness t of the substrate so that W/t becomes 0.2, 0.5, 0.8, 1.1, 1.4, 1.7, and 2.0.

(Depth D of the Ridge)

The depth D of the ridge was set by using a value normalized with the thickness t of the substrate so that D/t becomes 0.2, 0.4, 0.6, and 0.8.

(Height $T_{EL}$ of the Electrode)

The height $T_{EL}$ of the electrode was set to be 0.5, 1.0, 1.5, 2.0, 2.5, and 3.0 (μm)

(Gap G Between Electrodes)

The gap G between the electrodes was set by using a value normalized with the thickness t of the substrate so that G/t (denoted by "Gap/t" in the following drawing) was set to be 1.0, 2.25, 3.5, 4.75, and 6.0.

The half-wavelength voltage Vpai (denoted by "Vpi" in the following drawing), the impedance Z (denoted by "Z0" in the following drawing), and the microwave refraction index NM were calculated from the numerals set in the parameters. Results which satisfied the following conditions were assigned by "O", and results which did not satisfy the same conditions were assigned by "X".

(Evaluation Condition)

(1) Vpai≦12 (V·cm)

(2) 70Ω≦z≦130 Ω

(3) 1.5≦NM≦2.8

However, with respect to the range of the microwave refraction index NM, when the operation length L is 2 cm≦L≦6 cm, Δn×L becomes 1.3 or less.

The results performed under the above evaluation conditions will be described FIGS. 11 to 22.

Figure 12:
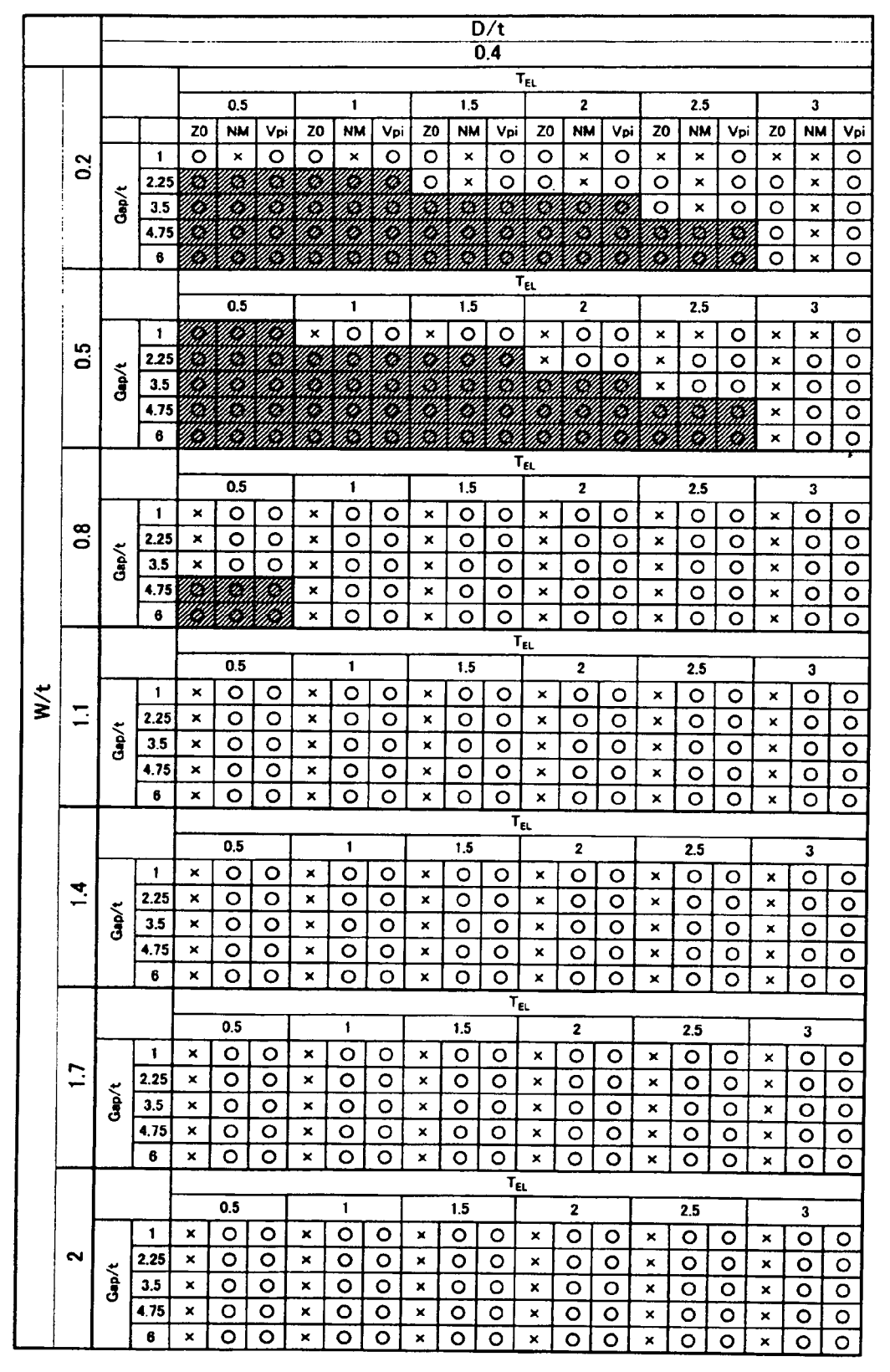
Figure 13:
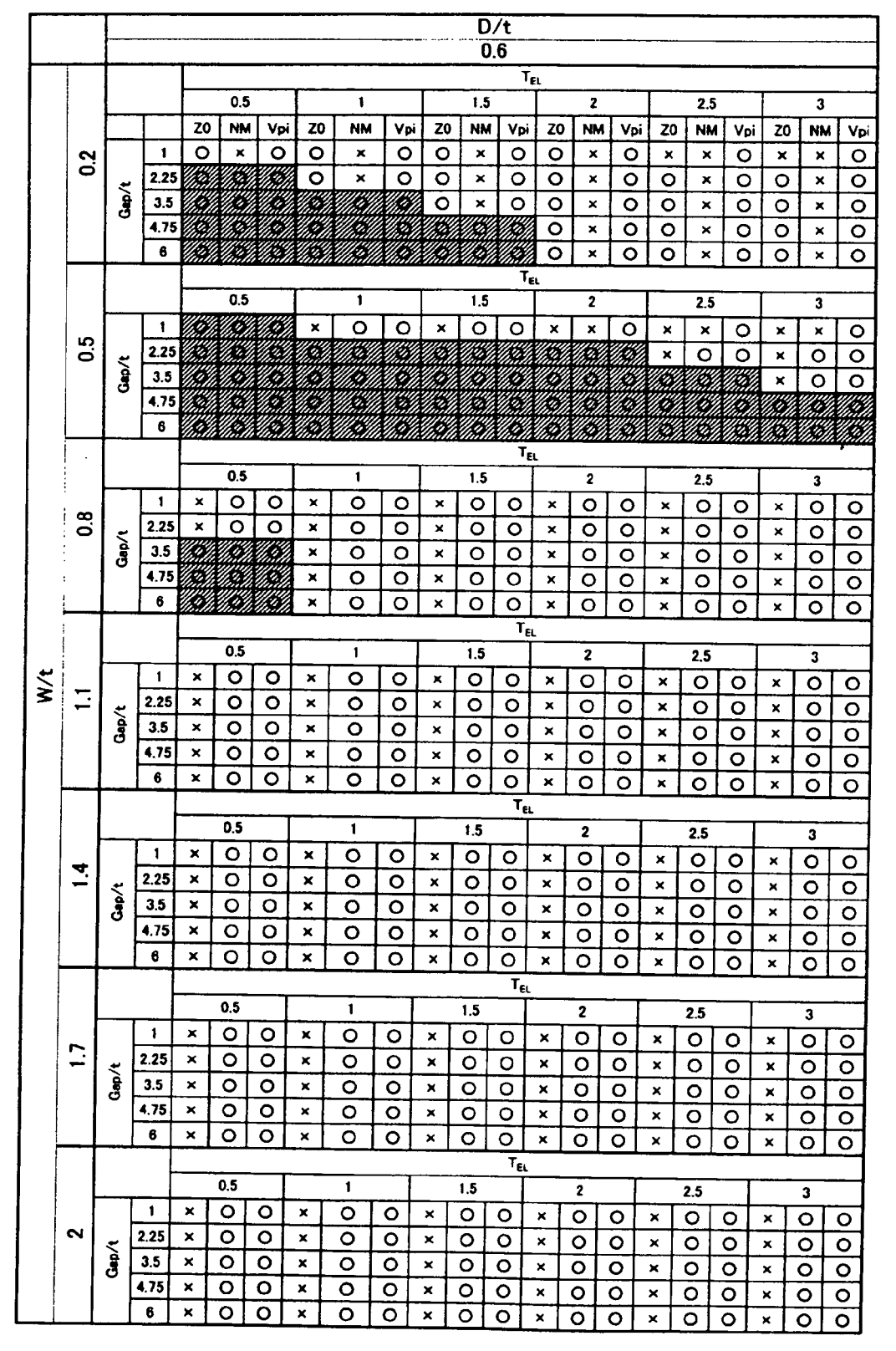
Figure 14:
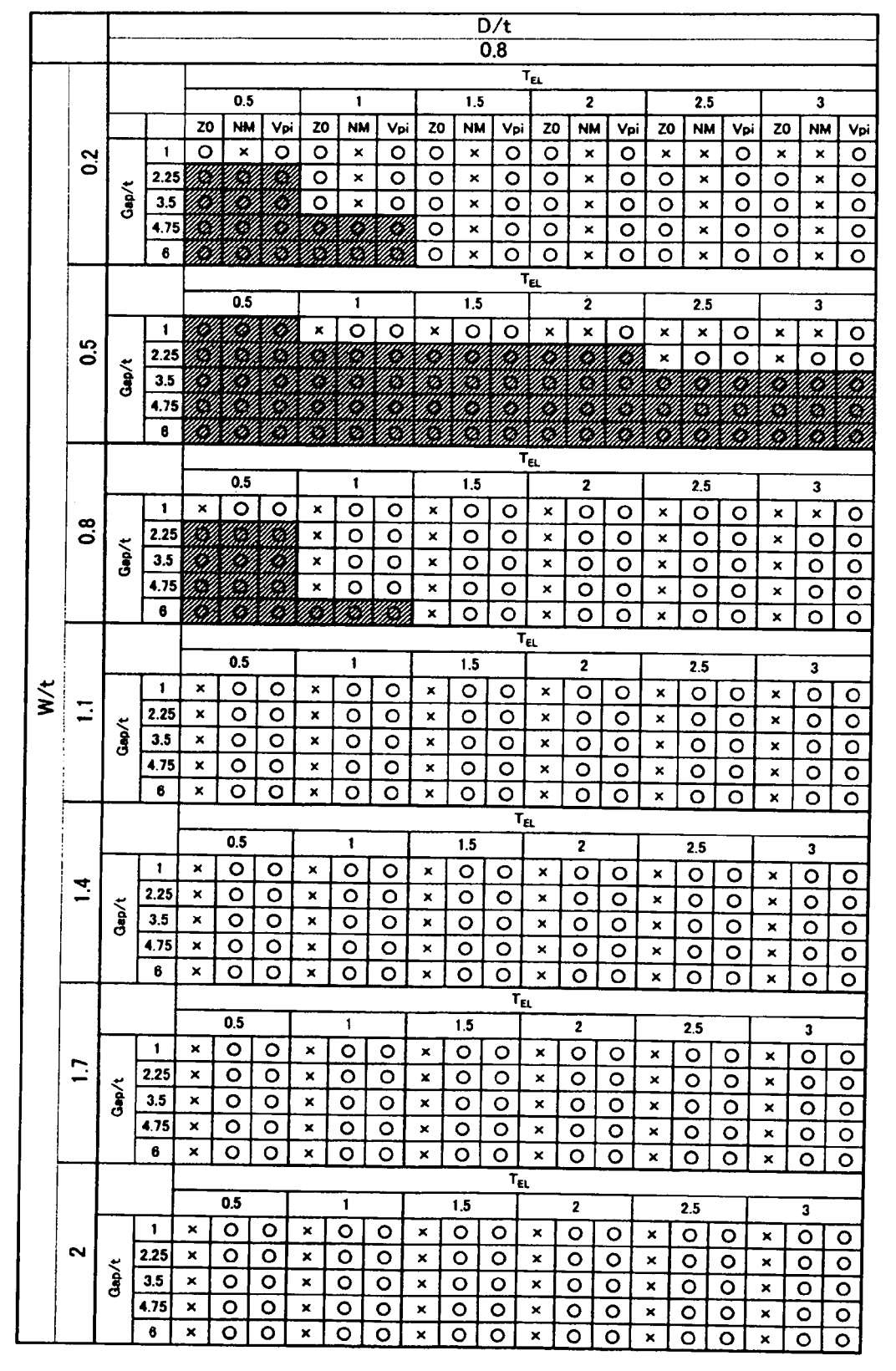

If t=2 μm, the results are illustrated in FIG. 11 (D/t=0.2), FIG. 12 (D/t=0.4), FIG. 13 (D/t=0.6), and FIG. 14 (D/t=0.8)

Figure 16:
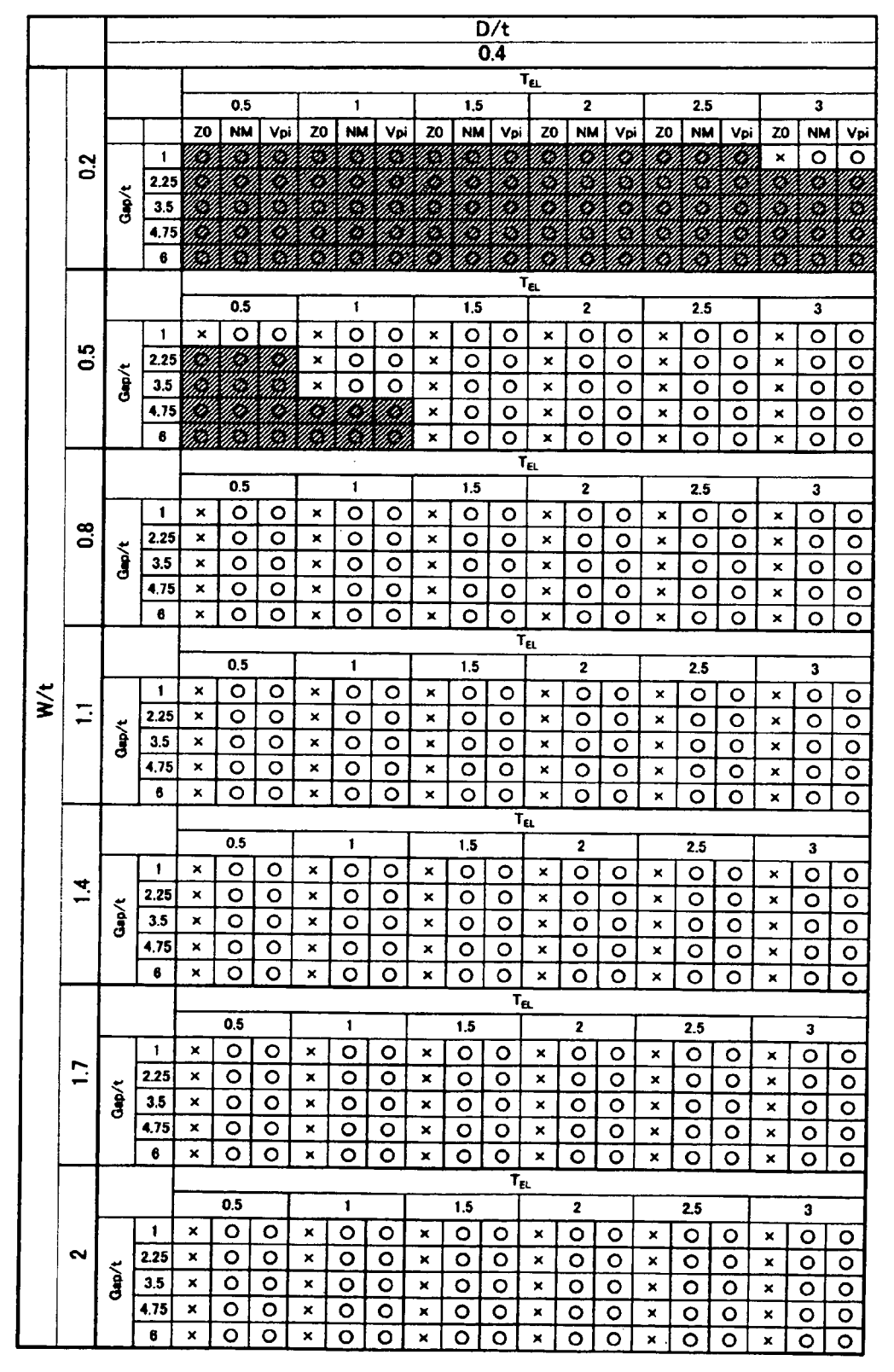
Figure 17:
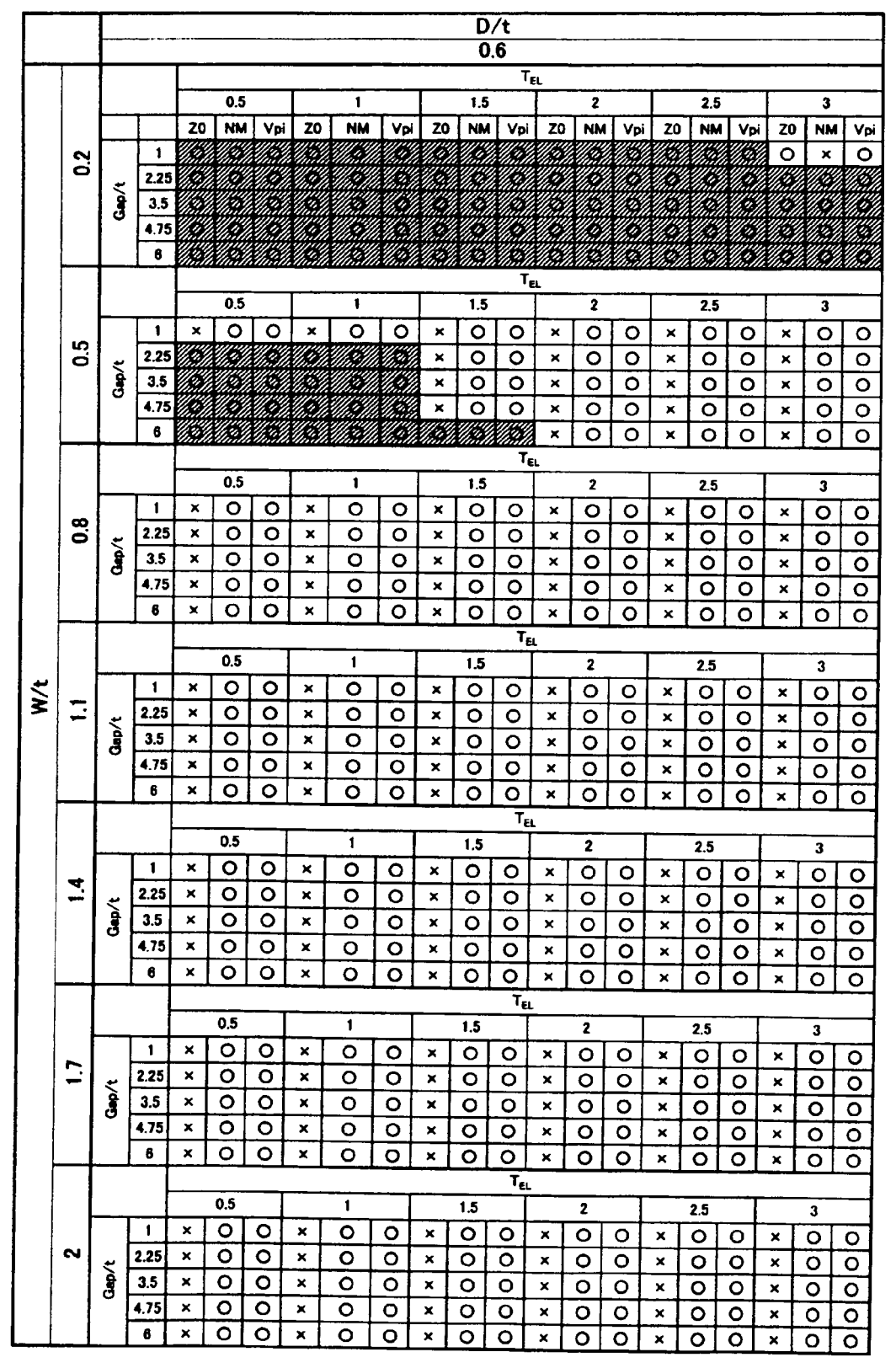
Figure 18:
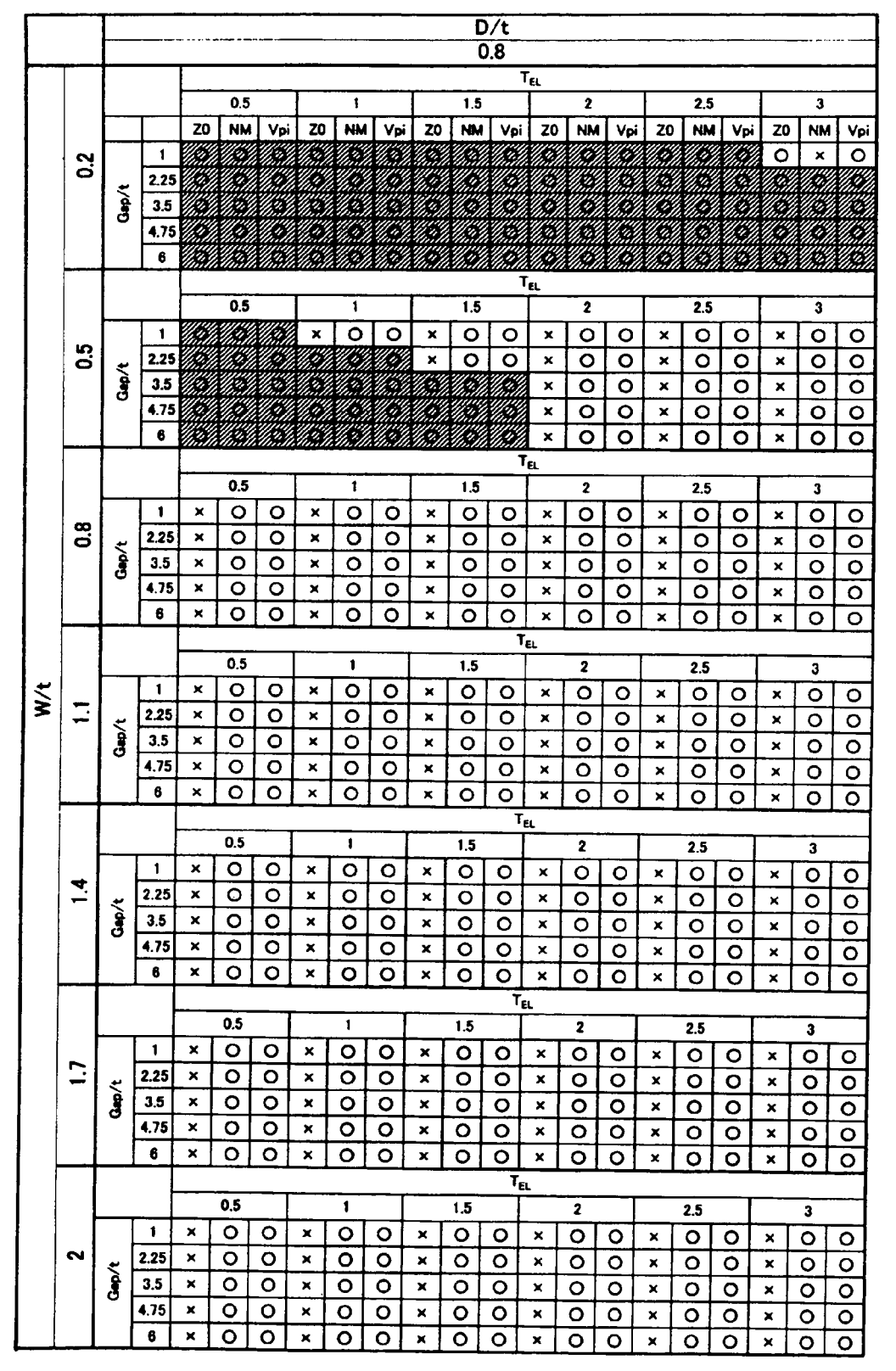

If t=4 μm, the results are illustrated in FIG. 15 (D/t=0.2), FIG. 16 (D/t=0.4), FIG. 17 (D/t=0.6), and FIG. 18 (D/t=0.8).

If t=10 μm, the results are illustrated in FIG. 19 (D/t=0.2), FIG. 20 (D/t=0.4), FIG. 21 (D/t=0.6), and FIG. 22 (D/t=0.8).

In addition, portions which are satisfied with all the evaluation conditions (1) to (3) are illustrated as shade portions.

It is understood from FIGS. 11 to 22 illustrating the results according to the light control device of the invention that the light control device which satisfies the conditions of the above-mentioned high impedance path can be easily implemented by adjusting the width W of the signal electrode, the gap G between the signal electrode and the grounding electrode, the height $T_{EL}$ of the signal electrode or the grounding electrode, the depth D of the ridge of the ridge type optical waveguide, and the thickness t of the substrate.

Moreover, with respect to the parameters, the following facts can be understood from the results shown in FIGS. 11 to 22.

(Range of Width W of the Signal Electrode)

Even if the thickness t of the substrate is any one of 2, 4, or 10 μm, a portion that satisfies the evaluation conditions is located in a range of W/t≦2.

The upper limit value of the width W is specified such that the impedance Z drifts away from the evaluation conditions.

In addition, the lower limit value of the width W is likely to be specified such that the half-wavelength voltage Vpai drifts away from the evaluation conditions. However, the smaller the width W becomes, the better the result may be. In this case, it is specified by the limit of the electrode manufacture.

(Range of Depth D of the Ridge)

Referring to data of t=2 or 4 μm, the upper limit value of the depth D is different in the limited conditions in the vicinity of the upper limit or the lower limit of the width W.

Specifically, when the half-wavelength voltage Vpai drifts away from the evaluation conditions in the vicinity of the lower limit boundary of the width W and the impedance Z drifts away form the evaluation conditions in the vicinity of the upper limit boundary of the width W, the upper limit value of the depth D is specified.

In general, when only the data is referred, the smaller the lower limit value of the depth D becomes, the better. However, since D/t=0 is impossible for manufacturing, it can be preferably said that the ridge is deeply formed in a range where the substrate is not broken.

(Range of Gap G of the Electrode)

Referring to data of t=2 or 4 μm, the lower limit value of the gap G is specified when the impedance Z or the microwave refraction index NM drifts away from the evaluation conditions.

In addition, even though the upper limit value of the gap G cannot be determined from a set range of the data, since the electric field weakens when the gap between the electrodes increases, the possibility that the upper limit of the gap G is limited by an increase of the half-wavelength voltage Vpai is high.

(Range of Height $T_{EL}$ of the Electrode)

Referring to data of t=2 or 4 μm, the upper limit value of the height $T_{EL}$ is specified when the microwave refraction index NM drifts away from the evaluation conditions in the vicinity of the lower limit boundary of the width W and the impedance Z drifts away from the evaluation conditions in the vicinity of the upper limit boundary of the width W.

Even though the lower limit value of the height $T_{EL}$ cannot be determined from a set range of the data, since the electric resistance increases when the electrode becomes excessively thinner, the possibility that the lower limit value of the height $T_{EL}$ is limited by an increase of the half-wavelength voltage Vpai is high.

INDUSTRIAL APPLICABILITY

According to the light control device of the present invention, when the signal path having a high impedance of 70Ω or more is required, the velocity matching between the microwave and the optical wave or the impedance matching of the microwaves can be realized. Moreover, it is possible to provide the light control device in which the driving voltage can be reduced.

In addition, thanks to the reduction in driving voltage, it is possible to suppress a rise in temperature of the light control device, and it is possible to provide the light control device which can operate stably. Further, it is possible to provide the light control device which can use a low-driving-voltage driving device which is inexpensive.

The invention claimed is:

1. A light control device having an electro-optical effect, comprising a thin plate having a thickness of 10 μm or less, an optical waveguide formed in the thin plate, and a controlling electrode for controlling light passing through the optical waveguide,
   wherein the controlling electrode comprises a first electrode and a second electrode, said first electrode and second electrode being disposed to interpose the thin plate,
   wherein the first electrode has a coplanar type electrode structure including at least a signal electrode and a grounding electrode,
   wherein the second electrode comprises at least a grounding electrode, and the second electrode is configured to apply an electric field to the optical waveguide in cooperation with the signal electrode of the first electrode, and
   wherein the signal electrode of the first electrode comprises a branched signal path wherein at least one signal path is branched into two or more branches in a middle of the signal path.

2. The light control device according to claim 1, wherein the thin plate, in at least a part of an operation region in the thin plate where an electric field is applied by the branched signal path, is reversely polarized.

3. The light control device according to claim 1, wherein the optical waveguide is a ridge type optical waveguide.

4. The light control device according to claim 3, wherein recesses disposed on sides of at least the ridge type waveguide are coated with a low-permittivity film.

5. The light control device according to claim 4, wherein a signal line for feeding the signal electrode of the first electrode is disposed to pass through a position above or below the grounding electrode of the first electrode, and a low-permittivity film is disposed between the signal line and the grounding electrodes of the first electrode.

6. The light control device according to claim 1, further comprising a buffer layer formed between the thin plate and the first electrode or the second electrode.

7. The light control device according to claim 1, wherein one or more of:
   the signal electrode of the first electrode,
   the grounding electrode of the first electrode,
   the grounding electrode of the second electrode, and
   a side of the thin plate,
   comprises a transparent electrode.

8. The light control device according to claim 1, wherein the second electrode is a patterning electrode having a shape corresponding to a shape of the optical waveguide.

9. The light control device according to claim 1, wherein the grounding electrode of the first electrode is electrically connected with the grounding electrode of the second electrode.

10. The light control device according to claim 9, wherein the grounding electrode of the first electrode is electrically connected with the grounding electrode of the second electrode via a through hole formed in the thin plate.

11. The light control device according claim 1, wherein the thin plate is bonded to a support substrate via an adhesion layer so as to interpose the first electrode or the second electrode.

12. The light control device according to claim 1, further comprising a support substrate reinforcing the thin plate, wherein the first electrode or the second electrode is disposed on the support substrate.

13. The light control device according to claim 1, wherein an impedance of the branched signal path is 70 Ω or more.

14. The light control device according to claim 13, wherein at least a width W, a height $T_{EL}$ of the signal electrode of the branched signal path, a gap G between the signal electrode and the grounding electrode, and a depth D of a ridge when the optical waveguide is a ridge type optical waveguide, are set such that a half-wavelength voltage Vpai in the branched signal path is 12 V·cm or less, an impedance Z is 70 Ω or more and 130 Ω or less, and a product of a reflection difference Δn between a light and a microwave and a length L of an operation portion where an electric field of the branched signal path operates to the optical waveguide is 1.3 cm or less.

* * * * *